(12) United States Patent
Yoshioka et al.

(10) Patent No.: US 11,148,536 B2
(45) Date of Patent: Oct. 19, 2021

(54) FUEL CELL SYSTEM

(71) Applicant: AISAN KOGYO KABUSHIKI KAISHA, Obu (JP)

(72) Inventors: Mamoru Yoshioka, Nagoya (JP); Naruto Ito, Nisshin (JP); Makoto Fukui, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 155 days.

(21) Appl. No.: 16/495,655

(22) PCT Filed: Apr. 20, 2018

(86) PCT No.: PCT/JP2018/016258
§ 371 (c)(1),
(2) Date: Sep. 19, 2019

(87) PCT Pub. No.: WO2018/216409
PCT Pub. Date: Nov. 29, 2018

(65) Prior Publication Data
US 2020/0099069 A1    Mar. 26, 2020

(30) Foreign Application Priority Data

May 25, 2017 (JP) .............................. JP2017-103837

(51) Int. Cl.
*B60L 50/70* (2019.01)
*H01M 8/04664* (2016.01)

(52) U.S. Cl.
CPC ......... *B60L 50/70* (2019.02); *H01M 8/04671* (2013.01); *H01M 2250/20* (2013.01)

(58) Field of Classification Search
CPC .......................... H01M 8/04671; B60L 50/70
(Continued)

(56) References Cited

U.S. PATENT DOCUMENTS

| 2016/0141682 A1 | 5/2016 | Yamanaka et al. |
| 2017/0069922 A1* | 3/2017 | Yamanaka ........ H01M 8/04253 |
| 2018/0034086 A1 | 2/2018 | Yoshioka et al. |

FOREIGN PATENT DOCUMENTS

| JP | 2006-179335 A | 7/2006 |
| JP | 2009-259577 A | 11/2009 |

(Continued)

OTHER PUBLICATIONS

Jul. 17, 2018 Search Report issued in International Patent Application No. PCT/JP2018/016258.

(Continued)

*Primary Examiner* — James M Erwin
(74) *Attorney, Agent, or Firm* — Oliff PLC

(57) ABSTRACT

In a fuel cell system, when fully closing an upstream-side valve, a controller performs controlled fully-closed opening-degree control that adjusts the opening degree of the upstream-side valve to a controlled fully-closing opening degree greater than zero by means of a drive mechanism. Upon determining that, during the controlled fully-closed opening-degree control, there is a leakage of oxidant gas in the upstream-side valve, the controller corrects the controlled fully-closed opening degree to the valve-closing side until reaching a zero-position opening degree at which the amount of leakage of the oxidant gas in the upstream-side valve becomes zero.

7 Claims, 28 Drawing Sheets

(58) Field of Classification Search
USPC .......................................................... 429/444
See application file for complete search history.

(56) References Cited

FOREIGN PATENT DOCUMENTS

| | | |
|---|---|---|
| JP | 2010-192251 A | 9/2010 |
| JP | 2010-192422 A | 9/2010 |
| JP | 2016-96087 A | 5/2016 |
| JP | 2018-26319 A | 2/2018 |

OTHER PUBLICATIONS

Jul. 17, 2018 Written Opinion of the International Searching Authority issued in International Patent Application No. PCT/JP2018/016258.

* cited by examiner

FUEL CELL SYSTEM

CROSS-REFERENCE TO RELATED APPLICATIONS

This is a US national phase application based on the PCT International Patent Application No. PCT/JP2018/016258 filed on Apr. 20, 2018, and claiming the priority of Japanese Patent Application No. 2017-103837 filed on May 25, 2017, the entire contents of which are herewith incorporated by reference.

TECHNICAL FIELD

The present disclosure relates to a fuel cell system provided with a fuel cell which generates electric power upon receipt of supply of fuel gas and oxidant gas and, more particularly, to a fuel cell system suitable to be mounted in fuel-cell vehicles.

BACKGROUND ART

As one of conventional arts, there is a fuel cell system disclosed in Patent Document 1. This fuel cell system is provided with a fuel cell stack (fuel cells), a gas supply passage for supplying oxidant gas to the fuel cell stack, an upstream-side valve for controlling supply of the oxidant gas to the fuel cell stack, a compressor provided in the gas supply passage, a gas exhaust passage for exhausting the oxidant gas from the fuel cell stack, a downstream-side valve for controlling the exhaust of the oxidant gas from the fuel cell stack, a bypass passage for exhausting the oxidant gas to the gas exhaust passage by detouring around the fuel cell stack, and a bypass valve provided in the bypass passage and configured to regulate a flow rate of the oxidant gas to be made to flow in the bypass passage.

Regarding such a fuel cell system, the present applicant has proposed a Japanese patent application No. 2017-041580, for example, to perform a controlled fully-closed opening-degree control that adjusts an opening degree of an upstream-side valve to a controlled fully-closed opening degree during deceleration of a fuel cell vehicle. Herein, the foregoing controlled fully-closed opening degree is an opening degree which is slightly larger than 0° and at which a valve element is in contact with a seal part provided in a valve seat, thereby keeping a valve-closed state.

RELATED ART DOCUMENTS

Patent Documents

Patent Document 1: Japanese unexamined patent application publication No. 2010-192251

SUMMARY OF INVENTION

Problems to be Solved by the Invention

In the above-mentioned fuel cell system, however, the controlled fully-closed opening-degree control is performed during deceleration in which the vehicle is operated with high frequency. This increases the number of times the opening degree of the upstream-side valve becomes the controlled fully-closed opening degree. Therefore, if the number of times the valve element contacts with the seal part provided in the valve seat increases, the seal part wears down. In such a situation, when the opening degree of the upstream-side valve is adjusted to the controlled fully-closed opening degree, oxidant gas may leak through the upstream-side valve. Thus, unnecessary oxidant gas may be supplied to a fuel cell. This oxidant gas reacts with the fuel gas already supplied to the fuel cell, generating electric power. Consequently, unnecessary electric power may be generated in the fuel cell.

The present disclosure has been made to solve the above problems and has a purpose to provide a fuel cell system capable of preventing unnecessary power generation in a fuel cell.

Means of Solving the Problems

To achieve the above purpose, one aspect of the invention provides a fuel cell system comprising: a fuel cell; an oxidant gas supply passage for supplying oxidant gas to the fuel cell; an upstream-side valve provided in the oxidant gas supply passage, and a controller configured to perform various controls, wherein the upstream-side valve comprises: a valve seat; a valve element; and a drive mechanism configured to drive the valve element to open and close a gap between the valve seat and the valve element, either one of the valve seat and the valve element is provided with a seal member including a seal part that contacts with an other of the valve element and the valve seat during valve-closing, wherein when the upstream-side valve is to be fully closed, the controller is configured to perform a controlled fully-closed opening-degree control that causes the drive mechanism to adjust an opening degree of the upstream-side valve to a controlled fully-closed opening degree that is larger than 0, and while the controlled fully-closed opening-degree control is being performed, when it is determined that leakage of the oxidant gas occurs in the upstream-side valve, the controller is configured to correct the controlled fully-closed opening degree to a valve-closing side until reaching a zero-position opening degree at which a leakage amount of the oxidant gas in the upstream-side valve becomes zero.

According to the above configuration, during execution of the controlled fully-closed opening-degree control, when leakage of oxidant gas occurs due to wear of the seal part in the upstream-side valve, this system can correct the controlled fully-closed opening degree to a valve-closing side according to a wear amount of the seal part to make zero the leakage amount of oxidant gas in the upstream-side valve. Thus, unnecessary supply of oxidant gas to a fuel cell can be reduced. This can prevent unnecessary generation of electric power in the fuel cell. Consequently, auxiliaries or auxiliary machines (AUXS) no longer need to consume electric power for electric discharge in order to consume unnecessary electric power generated in the fuel cell. This can prevent deterioration of fuel consumption and occurrence of noise vibration (NV).

In the foregoing configuration, the controller is configured to determine the leakage amount of the oxidant gas in the upstream-side valve based on a power generation amount of the fuel cell.

According to the above configuration, there is no need to further adopt a supplementary detection means, such as a sensor, for detecting a leakage amount of oxidant gas in the upstream-side valve. Cost reduction can thus be achieved.

In the foregoing configuration, preferably, the power generation amount of the fuel cell is an amount of electric power generated after the oxidant gas remaining in the fuel cell at start of the controlled fully-closed opening-degree control is consumed.

According to the above configuration, the amount of electric power generated in the fuel cell is a power generation amount corresponding to the amount of oxidant gas leaking through the upstream-side valve during execution of the controlled fully-closed opening-degree control. Thus, the system can accurately determine the leakage amount of oxidant gas in the upstream-side valve based on the power generation amount in the fuel cell.

Another aspect of the present disclosure made to solve the aforementioned problems provides a fuel cell system comprising: a fuel cell; an oxidant gas exhaust passage for exhausting oxidant gas supplied to the fuel cell; a downstream-side valve provided in the oxidant gas exhaust passage, and a controller configured to perform various controls, wherein the downstream-side valve comprises: a valve seat; a valve element; and a drive mechanism configured to drive the valve element to open and close a gap between the valve seat and the valve element, either one of the valve seat and the valve element is provided with a seal member including a seal part that contacts with an other of the valve element and the valve seat during valve-closing, wherein when an auxiliaries (AUXS) power-generation request to cause the fuel cell to generate electric power to drive auxiliaries is present, the controller is configured to perform an AUXS power-generation opening-degree control that causes the drive mechanism to adjust an opening degree of the downstream-side valve to an AUXS power-generation opening degree corresponding to a request AUXS power-generation amount, and while the AUXS power-generation opening-degree control is being performed, when it is determined that a flow rate of the oxidant gas in the downstream-side valve is larger than a first predetermined flow rate, the controller is configured to correct the AUXS power-generation opening degree to a valve-closing side until reaching a first target position opening degree at which the flow rate of the oxidant gas in the downstream-side valve becomes the first predetermined flow rate.

According to the foregoing configuration, during execution of the AUXS power-generation opening-degree control, when a flow rate of oxidant gas increases due to wear of the seal part in the downstream-side valve, the system can correct the AUXS power-generation opening degree to a valve-closing side according to the wear amount of the seal part and adjust the flow rate of oxidant gas in the downstream-side valve to a target flow rate. Accordingly, supply of unnecessary (excess) oxidant gas to the fuel cell is reduced, thus preventing generation of unnecessary (excess) electric power in the fuel cell. Consequently, the system can prevent excessive increase of the power generation amount in the fuel cell and hence prevent deterioration of fuel consumption and further eliminate the need to unnecessarily drive the auxiliaries.

In the foregoing configuration, while the AUXS power-generation opening-degree control is being performed, when it is determined that the flow rate of the oxidant gas in the downstream-side valve is lower than a second predetermined flow rate that is lower than the first flow rate, the controller is configured to correct the AUXS power-generation opening degree to a valve-opening side until reaching a second target position opening degree at which the flow rate of the oxidant gas in the downstream-side valve becomes the second predetermined flow rate.

According to the above configuration, when the control for correcting the AUXS power-generation opening degree is to be performed, the system can reduce the occurrence of hunting of the downstream-side valve and regulate the flow rate of oxidant gas in the downstream-side valve within a target range. Since the required electric power can be generated by the fuel cell, the auxiliaries can be driven according to the AUXS power-generation request.

In the foregoing configuration, the controller is configured to determine the flow rate of the oxidant gas in the downstream-side valve based on a power generation amount of the fuel cell.

According to the above configuration, there is no need to further adopt a supplementary detection means, such as a sensor, for detecting a flow rate of oxidant gas in the downstream-side valve. Thus, cost reduction can be achieved.

Effects of the Invention

According to a fuel cell system of the present disclosure, unnecessary power generation in the fuel cell can be reduced.

MODE FOR CARRYING OUT THE INVENTION

A detailed description of an embodiment of a fuel cell system which is one of typical embodiments of this disclosure will now be given referring to the accompanying drawings. In the present embodiment described below, the fuel cell system of the present disclosure is applied to a fuel cell system to be mounted in a fuel cell vehicle to supply electric power to a drive motor (not shown).

Figure 1:
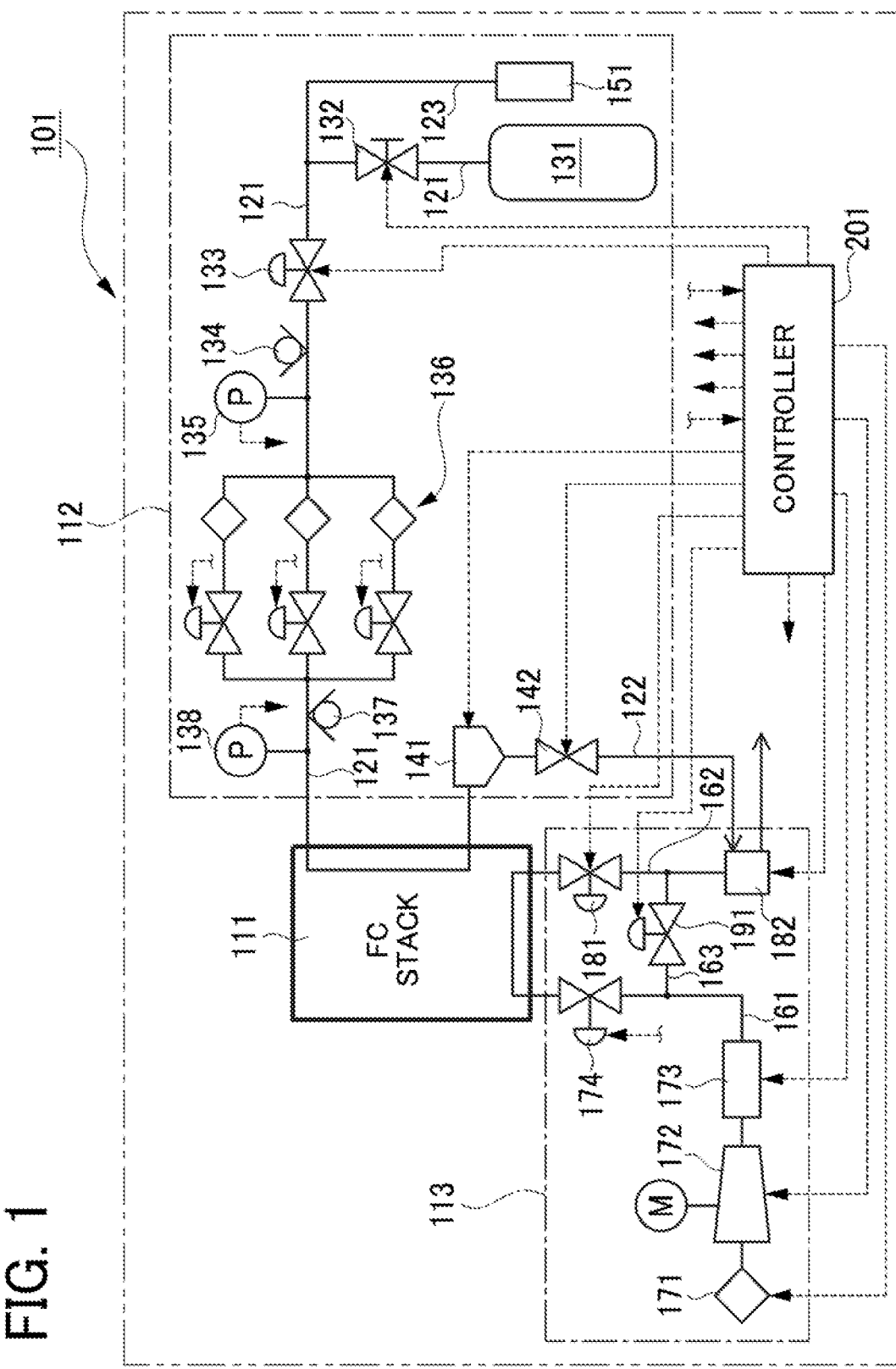
FIG. 1 is a schematic configuration view of a fuel cell system in an embodiment.

As shown in FIG. 1, a fuel cell system 101 in the present embodiment includes a fuel cell stack (fuel cells) 111, a hydrogen system 112, and an air system 113.

The fuel cell stack 111 generates electricity upon receipt of supply of fuel gas and supply of oxidant gas. In the present embodiment, the fuel gas is hydrogen gas and the oxidant gas is air. Specifically, the fuel cell stack 111 is configured to produce electric power upon receipt of the hydrogen gas supplied from the hydrogen system 112 and the air supplied from the air system 113. The electric power generated in the fuel cell stack 111 will be supplied to a drive motor (not shown) through an inverter (not shown).

The hydrogen system 112 is provided on an anode side of the fuel cell stack 111. This hydrogen system 112 is provided with a hydrogen supply passage 121, a hydrogen exhaust passage 122, and a filling passage 123. The hydrogen supply passage 121 is a flow passage to supply hydrogen gas from a hydrogen tank 131 to the fuel cell stack 111. The hydrogen exhaust passage 122 is a flow passage to exhaust hydrogen gas to be discharged out of the fuel cell stack 111 (hereinafter, appropriately referred to as "hydrogen offgas"). The filling passage 123 is a flow passage to fill hydrogen gas into the hydrogen tank 131 through a fill port 151.

The hydrogen system 112 includes, on the hydrogen supply passage 121, a main stop valve 132, a high-pressure regulator 133, a medium-pressure relief valve 134, a pressure sensor 135, an injector part 136, a low-pressure relief valve 137, and a pressure sensor 138, which are arranged from a side close to the hydrogen tank 131. The main stop valve 132 is a valve for switching supply and shutoff of hydrogen gas from the hydrogen tank 131 to the hydrogen supply passage 121. The high-pressure regulator 133 is a pressure regulating valve to reduce the pressure of hydrogen gas. The medium-pressure relief valve 134 is a valve configured to open when the pressure between the high-pressure regulator 133 and the injector part 136 becomes a predetermined pressure or higher in order to regulate the pressure to below the predetermined pressure. The pressure sensor 135 is a sensor to detect the pressure in the hydrogen supply passage 121 between the high-pressure regulator 133 and the injector part 136. The injector part 136 is a mechanism for regulating a flow rate of hydrogen gas. The low-pressure relief valve 137 is a valve configured to open when the pressure in the hydrogen supply passage 121 between the injector part 136 and the fuel cell stack 111 becomes a predetermined pressure or higher in order to regulate the pressure to below the predetermined pressure. The pressure sensor 138 is a sensor to detect the pressure in the hydrogen supply passage 121 between the injector part 136 and the fuel cell stack 111.

The hydrogen system 112 further includes, on the hydrogen exhaust passage 122, a gas-liquid separator 141 and an exhaust-drain valve 142 arranged in this order from a side close to the fuel cell stack 111. The gas-liquid separator 141 is a device to separate moisture from the hydrogen offgas. The exhaust-drain valve 142 is a valve to switch exhaust and shutoff of hydrogen offgas and moisture from the gas-liquid separator 141 to a diluter 182 of the air system 113.

The air system 113 is provided on a cathode side of the fuel cell stack 111. This air system 113 is provided with an air supply passage 161 (an oxide gas supply passage), an air exhaust passage 162, and a bypass passage 163. The air supply passage 161 is a flow passage to supply air from the outside of the fuel cell system 101 into the fuel cell stack 111. The air exhaust passage 162 is a flow passage to exhaust air discharged out of the fuel cell stack 111 (hereinafter, appropriately referred to as "air offgas"). The bypass passage 163 is a flow passage to allow air to flow from the air supply passage 161 to the air exhaust passage 162 without passing through the fuel cell stack 111.

The air system 113 further includes an air cleaner 171, a compressor 172, an intercooler 173, and an inlet sealing valve (an upstream-side valve) 174, which are arranged in this order. The air cleaner 171 is a device to clean up air externally taken in the fuel cell system 101. The compressor 172 is a device to supply air to the fuel cell stack 111. The intercooler 173 is a device to cool air. The inlet sealing valve 174 is a sealing valve to switch supply and shutoff of air flow to the fuel cell stack 111. As this inlet sealing valve 174, an eccentric valve is adopted in which a seal surface of a valve element is placed eccentrically from a rotary shaft. The details of the inlet sealing valve 174 will be described later.

The air system 113 further includes, on the air exhaust passage 162, an outlet integration valve (a downstream-side valve) 181 and a diluter 182 arranged in this order from a side close to the fuel cell stack 111.

The outlet integration valve 181 is a valve (a valve having a function of pressure regulation (flow control)) to regulate the back pressure of the fuel cell stack 111 to thereby control an exhaust amount of air offgas from the fuel cell stack 111. The outlet integration valve 181 in the present embodiment is an eccentric valve basically identical in structure to the inlet sealing valve 174 (a rubber seat 21 can be different in structure). The details of this outlet integration valve 181 will be described later.

The diluter 182 is a device to dilute hydrogen offgas exhausted from the hydrogen exhaust passage 122 by the air offgas and the air flowing through the bypass passage 163.

The air system 113 further includes a bypass valve 191 on the bypass passage 163. The bypass valve 191 is a valve to control a flow rate of air in the bypass passage 163. As this bypass valve 191, an eccentric valve is adopted, which is substantially identical in structure (excepting the absence of the rubber seat 21) to the inlet sealing valve 174 and the outlet integration valve 181. The details of the bypass valve 191 will be described later.

The fuel cell system 101 is further provided with a controller (a controller) 201 to control the system. Specifically, the controller 201 is configured to control each part or device of the fuel cell system 101 and perform various determinations. In addition, the fuel cell system 101 also includes a cooling system (not shown) to cool the fuel cell stack 111.

In the fuel cell system 101 configured as above, the hydrogen gas supplied from the hydrogen supply passage 121 to the fuel cell stack 111 is consumed in the fuel cell stack 111 to generate electric power and thereafter is exhausted as hydrogen offgas from the fuel cell stack 111 to the outside of the fuel cell system 101 through the hydrogen exhaust passage 122 and the diluter 182. The air supplied from the air supply passage 161 to the fuel cell stack 111 is consumed in the fuel cell stack 111 to generate electric power and then is exhausted as air offgas from the fuel cell stack 111 to the outside of the fuel cell system 101 through the air exhaust passage 162 and the diluter 182.

Herein, the inlet sealing valve 174, the outlet integration valve 181, and the bypass valve 191 will be described below with reference to FIGS. 2 to 21. Those valves are basically identical in structure excepting that the inlet sealing valve 174 and the outlet integration valve 181 may be different in structure of a rubber seat and that the bypass valve 191 includes no rubber seat. Thus, the following explanation will be given with a focus on the inlet sealing valve 174, and explanations of the outlet integration valve 181 and the bypass valve 191 are appropriately added.

Figure 2:
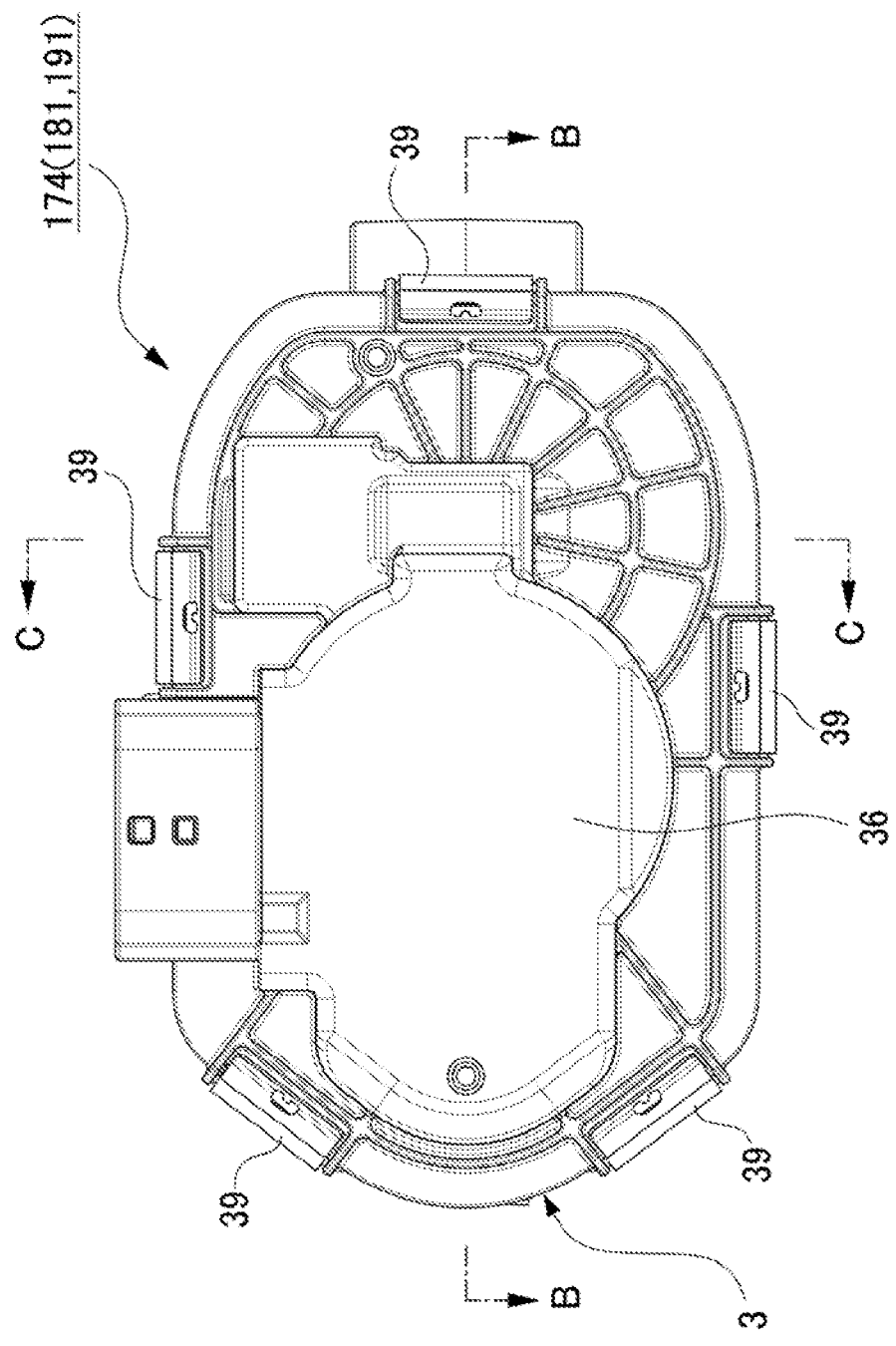
FIG. 2 is a front view of an inlet sealing valve.
Figure 3:
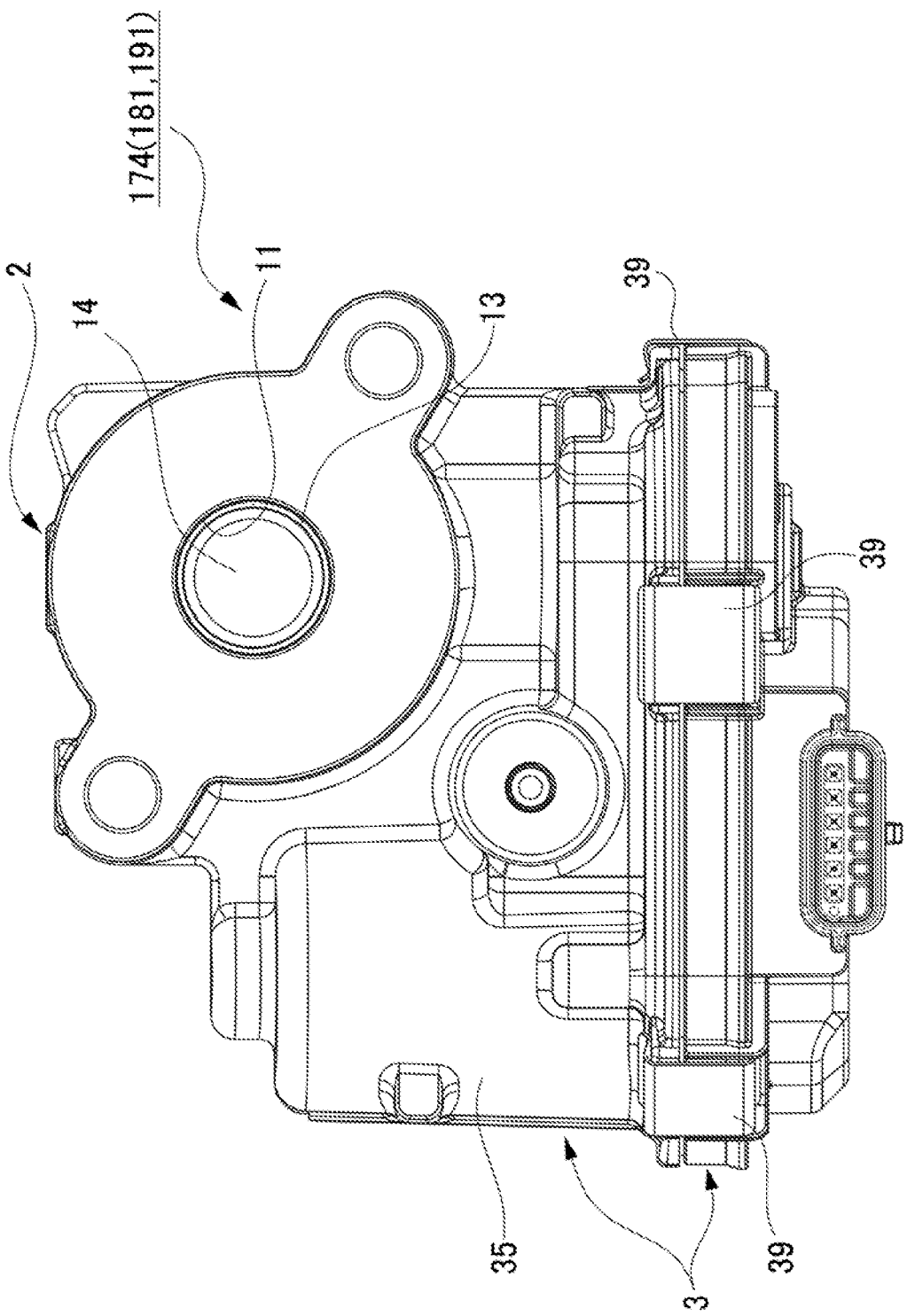
FIG. 3 is a plan view of the inlet sealing valve.

As shown in FIGS. 2 and 3, the inlet sealing valve 174 is provided with a valve section 2 and a drive mechanism section 3. The valve section 2 includes a pipe part 12 (see FIG. 8) having a passage 11 for allowing air (atmospheric air) to flow. In this passage 11, there are placed a valve seat 13, a valve element 14, and a rotary shaft 15. The rotary shaft 15 receives a driving force (torque) transmitted from the drive mechanism section 3. This drive mechanism section 3 includes a motor 32 and a speed-reducing mechanism 33 (see FIGS. 8 and 9).

Figure 4:
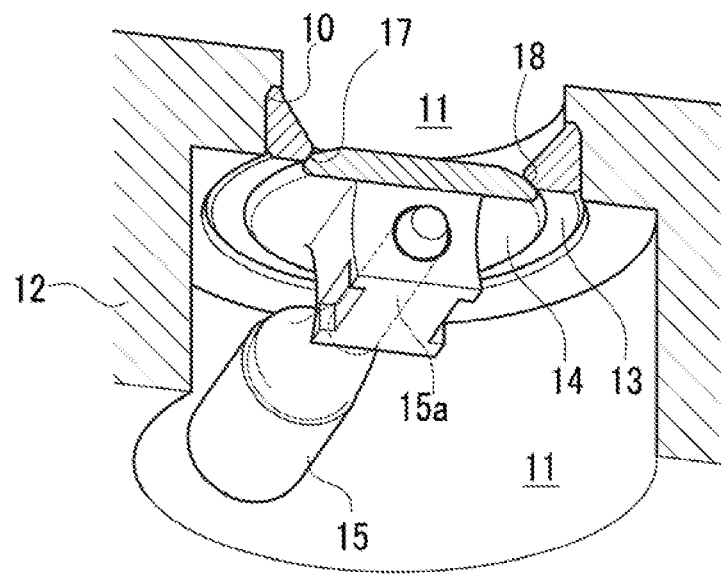
FIG. 4 is a partially-cutaway perspective view of a valve section in a valve-closed state (a fully-closed state) in which a valve element is in contact with a valve seat.
Figure 5:
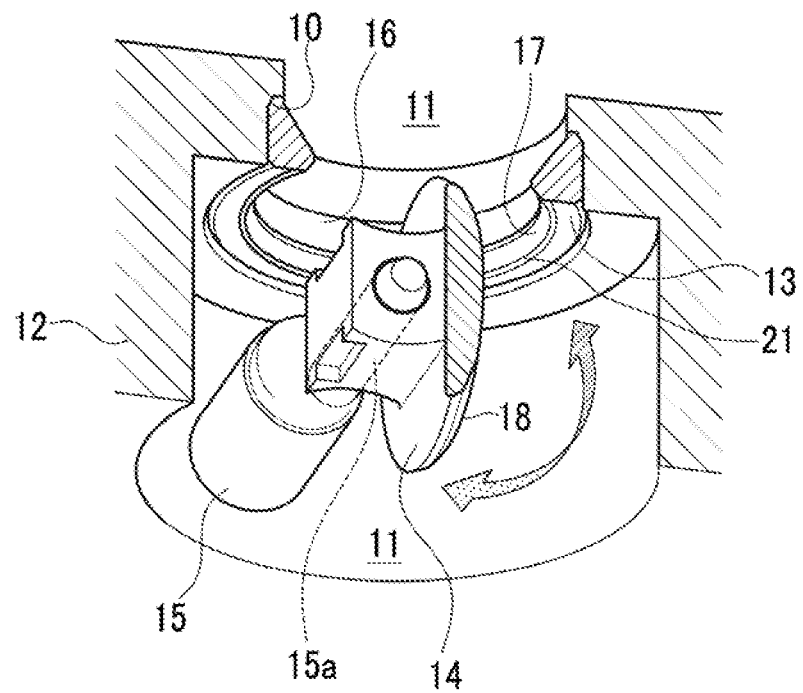
FIG. 5 is a partially-cutaway perspective view of the valve section in a valve open state in which the valve element is most away from the valve seat.

As shown in FIGS. 4 and 5, the passage 11 is formed with a recessed shoulder 10 in which the valve seat 13 is fitted. The valve seat 13 has a circular ring shape formed with a valve hole 16 at the center. The valve hole 16 is formed, at its circumferential edge, with an annular seat surface 17. The valve element 14 includes a circular disc-shaped portion whose outer periphery has an annular seal surface 18 which corresponds to, i.e., which will be brought in contact with, the seat surface 17. The valve element 14 is integrally provided with the rotary shaft 15 and rotatable together with the rotary shaft 15.

Figure 21:
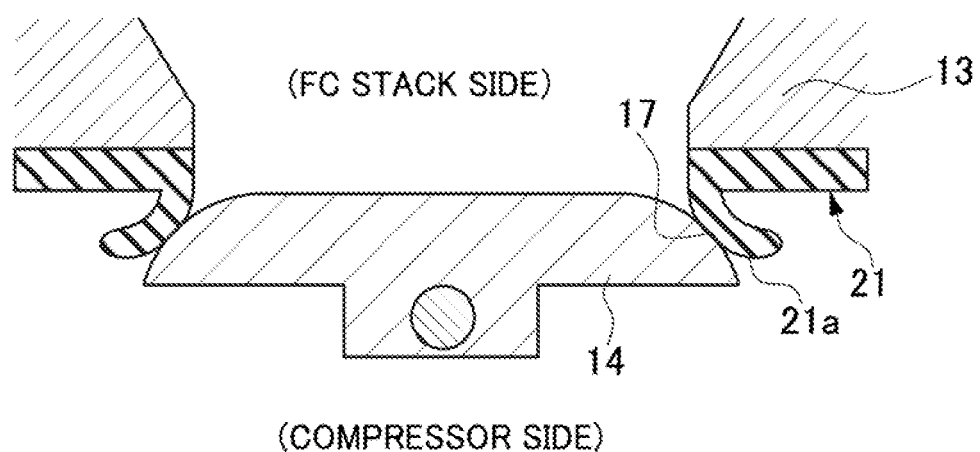
FIG. 21 is a view of a rubber seat.

In the present embodiment, the valve seat 13 is provided with a rubber seat (a seal member) 21 (see FIG. 21). The seat surface 17 is formed in this rubber seat 21. The details of the rubber seat 21 will be described later. In the bypass valve 191 that is not provided with the rubber seat 21, the seat surface 17 is formed in the valve seat 13.

In the present embodiment, referring to FIGS. 4 and 5, the inlet sealing valve 174 is configured such that the passage 11 formed on an opposite side (i.e., an upper side in the figures) to the valve element 14 and the rotary shaft 15 with respect to the valve seat 13 is located on a side close to the fuel cell stack 111 (on a downstream side of air flow), while the passage 11 formed on a side (i.e., a lower side in the figures) close to the valve element 14 and the rotary shaft 15 with respect to the valve seat 13 is located on a side close to a compressor (on an upstream side of air flow). In other words, in the present embodiment, the air will flow in the passage 11 from the valve element 14 (the rotary shaft 15) side toward the valve seat 13 side.

In the outlet integration valve 181, reversely from the inlet sealing valve 174, the passage 11 formed on the opposite side to the valve element 14 and the rotary shaft 15 with respect to the valve seat 13 is located on the side close to the fuel cell stack 11 (on an upstream side of air flow), while the passage 11 formed on the side close to the valve element 14 and the rotary shaft 15 with respect to the valve seat 13 is located on a side close to the diluter 182 (on a downstream side of air flow). In other words, in the outlet integration valve 181, the air will flow in the passage 11 from the valve seat 13 side toward the valve element 14 (the rotary shaft 15) side.

In the bypass valve 191, furthermore, the passage 11 formed on the side close to the valve element 14 and the rotary shaft 15 with respect to the valve seat 13 is located on a side close to the air supply passage 161 (on an upstream side of air flow), while the passage 11 formed on the side opposite to the valve element 14 and the rotary shaft 15 with respect to the valve seat 13 is located on a side close to the air exhaust passage 162 (on a downstream side of air flow). In other words, in the bypass valve 191, the air will flow in the passage 11 from the valve element 14 (the rotary shaft 15) side toward the valve seat 13 side.

Figure 6:
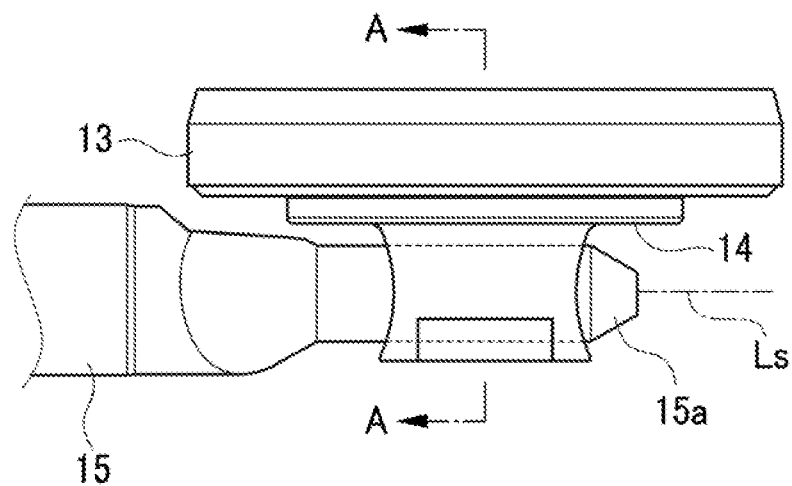
FIG. 6 is a side view of the valve seat, the valve element, and a rotary shaft in the inlet sealing valve in a valve-closed state.
Figure 7:
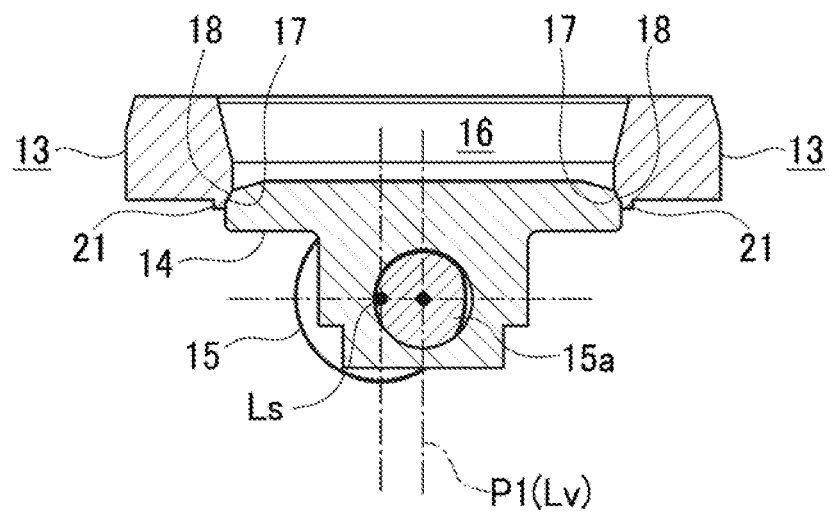
FIG. 7 is a cross sectional view taken along a line A-A in FIG. 6.

As shown in FIGS. 6 and 7, the central axis Ls of the rotary shaft 15 extends in parallel to the diameter of the valve element 14 (more concretely, the diameter of the disc-shaped portion of the valve element 14) and is positioned eccentrically from the central axis P1 of the valve hole 16 to one side in a radial direction of the valve hole 16. The seal surface 18 of the valve element 14 is positioned eccentrically from the central axis Ls of the rotary shaft 15 to an extending direction of the central axis Lv of the valve element 14.

By rotation of the valve element 14 about the central axis Ls of the rotary shaft 15, the valve element 14 is movable between a valve-closing position in which the seal surface 18 of the valve element 14 is in surface contact with the seat surface 17 (see FIG. 4) and a fully-opened position in which the seal surface 18 is most away from the seat surface 17 (see FIG. 5).

Figure 8:
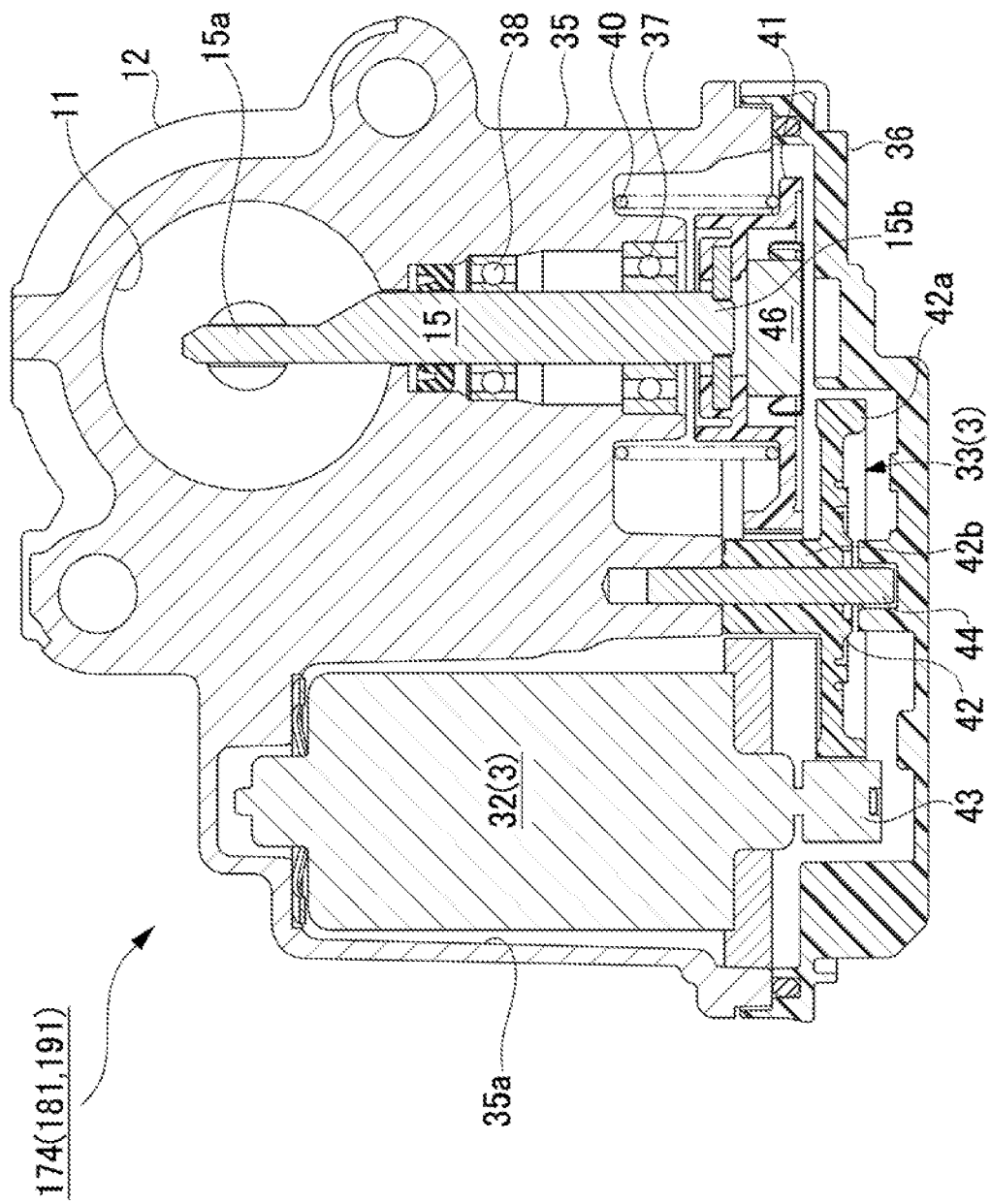
FIG. 8 is a cross sectional view taken along a line B-B in FIG. 2.
Figure 9:
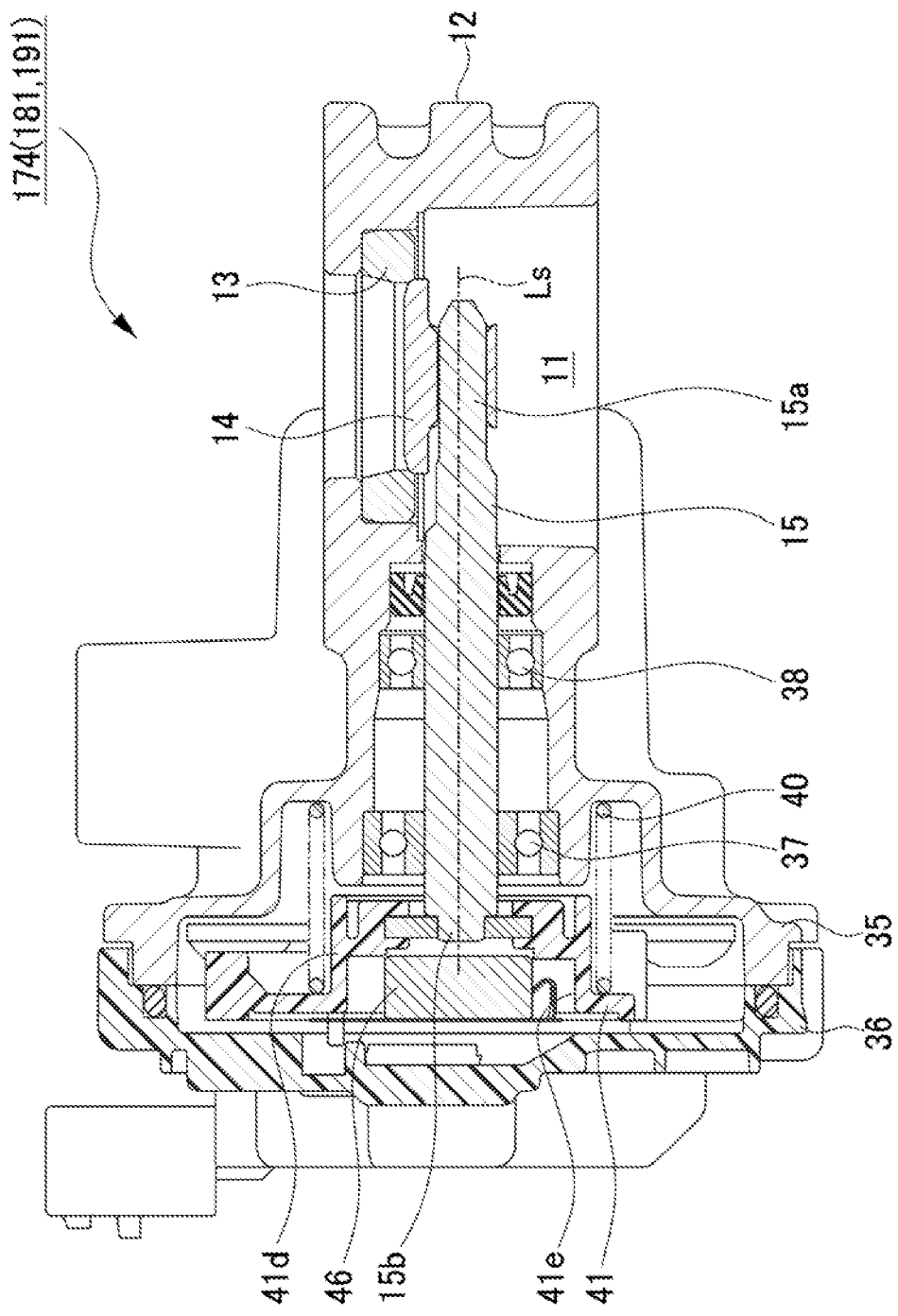
FIG. 9 is a cross sectional view taken along a line C-C in FIG. 2.
Figure 10:
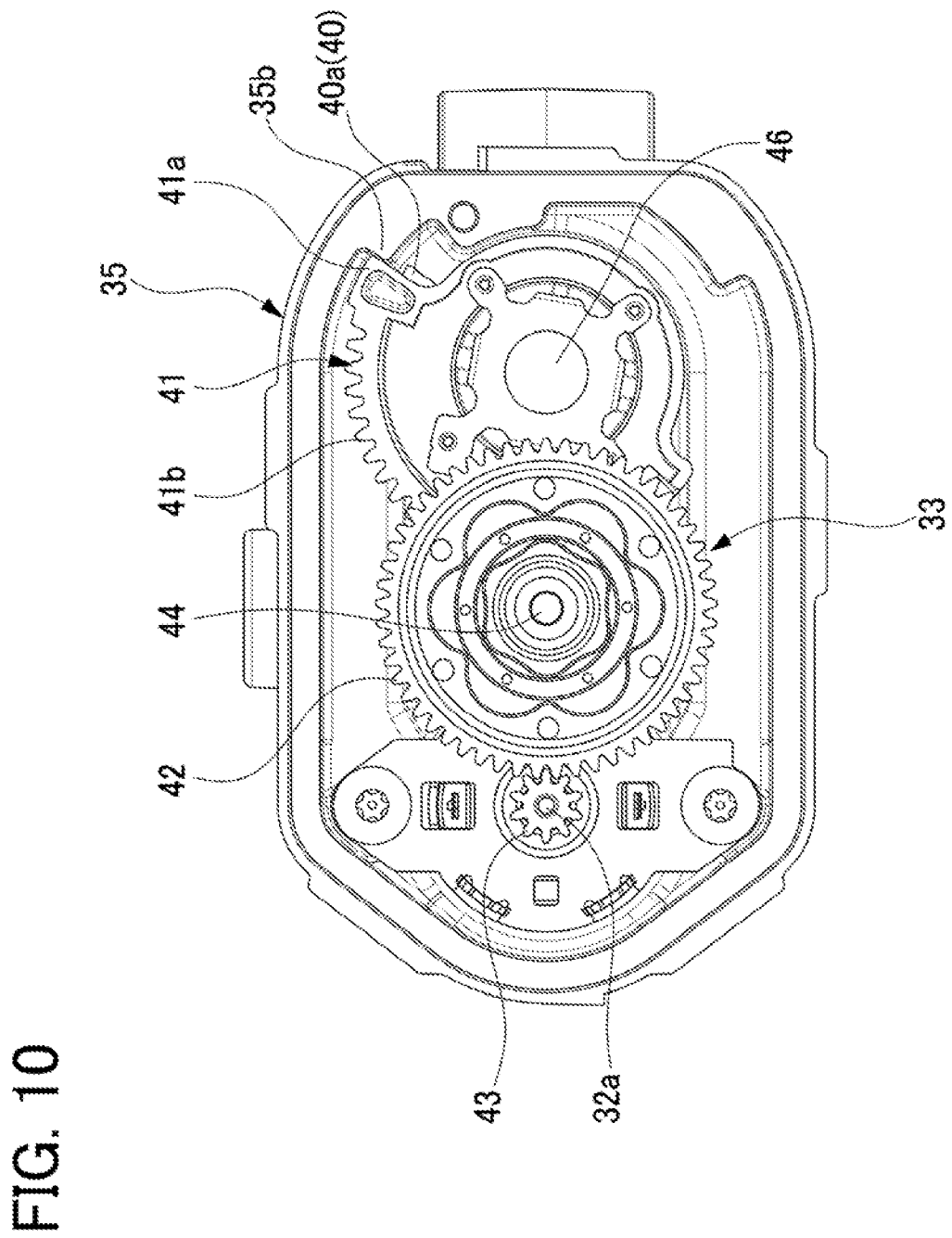
FIG. 10 is a front view showing a state in which an end frame is removed from a valve housing.

As shown in FIGS. 8 and 9, a valve housing 35 made of either metal or synthetic resin is provided with the passage 11 and the pipe part 12. An end frame 36 made of either metal or synthetic resin closes an open end of the valve housing 35. The valve element 14 and the rotary shaft 15 are placed in the valve housing 35. The rotary shaft 15 includes a pin 15a in its distal end portion. The pin 15a specifically is provided at one end of the rotary shaft 15 in a direction of the central axis Ls (on the side close to the valve element 14). The pin 15a has a diameter smaller than a diameter of a part of the rotary shaft 15 other than the pin 15a. At the other end of the rotary shaft 15 (on the side close to the main gear 41) in the direction of the central axis Ls, there is provided with a proximal end portion 15b.

The distal end portion of the rotary shaft 15 formed with the pin 15a is a free distal end which is inserted and placed in the passage 11 of the pipe part 12. The rotary shaft 15 is supported in a cantilever configuration through two bearings arranged apart from each other, that is, a first bearing 37 and a second bearing 38, so that the rotary shaft 15 is rotatable with respect to the valve housing 35. The first bearing 37 and the second bearing 38 are each constituted of a ball bearing. Those first and second bearings 37 and 38 are placed between the valve element 14 and the main gear 41 in the direction of the central axis Ls of the rotary shaft 15 to rotatably support the rotary shaft 15. In the present embodiment, the first bearing 37 is located at a position on a side close to the main gear 41 relative to the second bearing 38. The valve element 14 is fixed by welding to the pin 15a in the distal end portion of the rotary shaft 15 and is placed in the passage 11.

The end frame 36 is secured to the valve housing 35 with a plurality of clips 39 (see FIGS. 2 and 3). As shown in FIGS. 8 and 9, to the proximal end portion 15b of the rotary shaft 15, the main gear 41 provided with a fan-shaped gear is fixed. A return spring 40 is provided between the valve housing 35 and the main gear 41 to produce a return spring force Fs1. This return spring force Fs1 is the force that rotates the rotary shaft 15 in a valve closing direction and that urges the valve element 14 in a valve closing direction.

Figure 11:
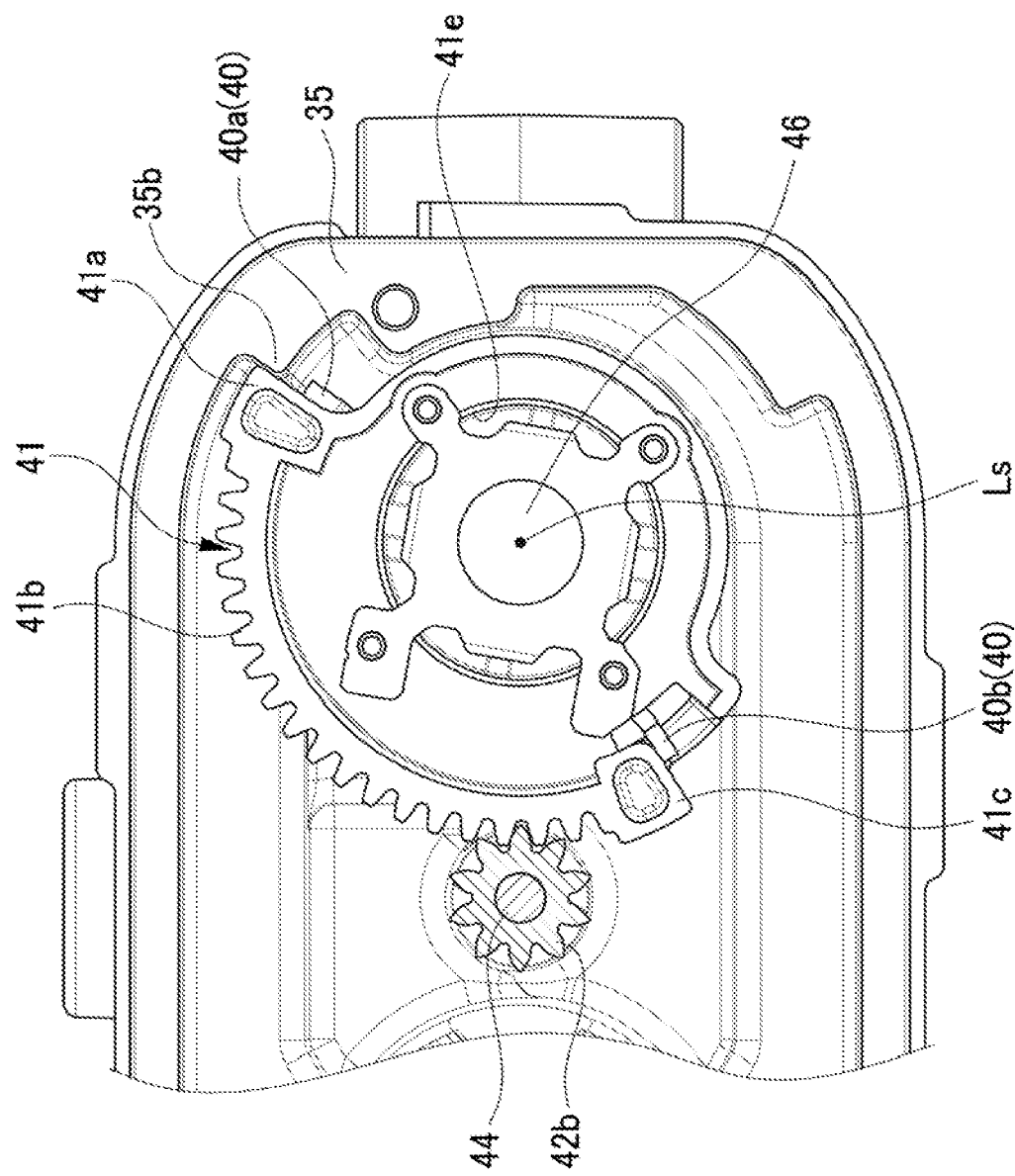
FIG. 11 is an enlarged view (a partially-cutaway cross sectional view) of a main gear, a return spring, an intermediate gear, and their surrounding parts during non-operation of a motor.

The return spring 40 is an elastic member made of wire wound in a coil shape and is provided, at both ends, with a far-side hook 40a and a near-side hook 40b as shown in FIG. 11. The far-side hook 40a and the near-side hook 40b are spaced at an interval of about 180° in a circumferential direction of the return spring 40. The far-side hook 40a is located on a side close to the valve housing 35 (on a far-side of a drawing sheet of FIG. 11) so that it contacts a spring hook part 35c (see FIG. 19) of the valve housing 35. In contrast, the near-side hook 40b is located on a side close to the main gear 41 (on a near-side of the drawing sheet of FIG. 11) so that it contacts a spring hook part 41c of the main gear 41.

As shown in FIGS. 8 to 11, the main gear 41 includes a full-close stopper part 41a, a gear part 41b, a spring hook part 41c, a spring guide part 41d, and others. In the circumferential direction (a counterclockwise direction in FIG. 11) of the main gear 41, the full-close stopper part 41a, the gear part 41b, and the spring hook part 41c are arranged in this order. The main gear 41 is integrally provided with the rotary shaft 15 and is configured to receive driving force generated by the motor 32. The full-close stopper part 41a is a part that abuts on the full-close stopper part 35b of the valve housing 35 when an opening degree θ is 0.

As shown in FIG. 8, the motor 32 is accommodated and fixed in a holding cavity 35a of the valve housing 35. The motor 32 is operative to generate driving force to rotate the rotary shaft 15 in a valve opening direction and a valve closing direction. The motor 32 is coupled to the rotary shaft 15 to transmit the driving force through the speed reducing mechanism 33 in order to open and close the valve element 14. Specifically, a motor gear 43 is fixed to an output shaft 32a (see FIG. 10) of the motor 32. This motor gear 43 is connected to the main gear 41 to transmit the driving force thereto through an intermediate gear 42.

The intermediate gear 42 is a double gear having a large-diameter gear 42a and a small-diameter gear 42b and is rotatably supported by the valve housing 35 through a pin shaft 44. The diameter of the large-diameter gear 42a is larger than the diameter of the small-diameter gear 42b. The large-diameter gear 42a is drivingly engaged with the motor gear 43, while the small-diameter gear 42b is drivingly engaged with the main gear 41. In the present embodiment, the main gear 41, the intermediate gear 42, and the motor gear 43, constituting the speed reducing mechanism 33, are each made of resin.

The motor 32 is one example of a "drive mechanism" in the present disclosure. The intermediate gear 42 (a drive transmission part) transmits the driving force of the motor 32 to the rotary shaft 15.

In the inlet sealing valve 174 configured as above, when the motor 32 is energized from a state that the valve element 14 is held in a valve-closed state (in which the entire circumference of the seal surface 18 of the valve element 14 is in contact with the entire circumference of the seat surface 17 of the valve seat 13 (the rubber seat 21)) as shown in FIG. 4, even though the details will be described later, the force (the motor driving force Fm1 (see FIG. 14)) that pushes the gear teeth is exerted on the main gear 41, thereby moving the valve element 14 in a direction toward the valve seat 13 by the principle of leverage (see FIG. 15). After that, when the drive voltage (current) applied to the motor 32 is gradually raised, the output shaft 32a and the motor gear 43 are rotated in a forward direction (i.e., a direction to open the valve element 14) and this rotation is reduced in speed through the intermediate gear 42 and then transmitted to the main gear 41. Accordingly, the valve element 14 is opened against the return spring force Fs1 that is generated by the return spring 40 and that urges the valve element 14 in the valve closing direction, and thus the passage 11 is opened (see FIGS. 16 and 18). Subsequently, when the drive voltage applied to the motor 32 is maintained at a constant level in the process of opening the valve element 14, the motor driving force Fm1 and the return spring force Fs1 become balanced with each other at the opening degree of the valve element 14 at that time, so that the valve element 14 is held at a predetermined opening degree.

The details of the operations of the inlet sealing valve 174 in the present embodiment will be described below. During non-operation of the motor 32 that is not energized (i.e., during stop of the motor 32), the valve opening degree θ is 0, that is, the inlet sealing valve 174 is fully closed (at a mechanical fully-closed opening degree). At that time, as shown in FIG. 11, the full-close stopper part 41a of the main gear 41 contacts with the full-close stopper part 35b of the valve housing 35.

Figure 12:
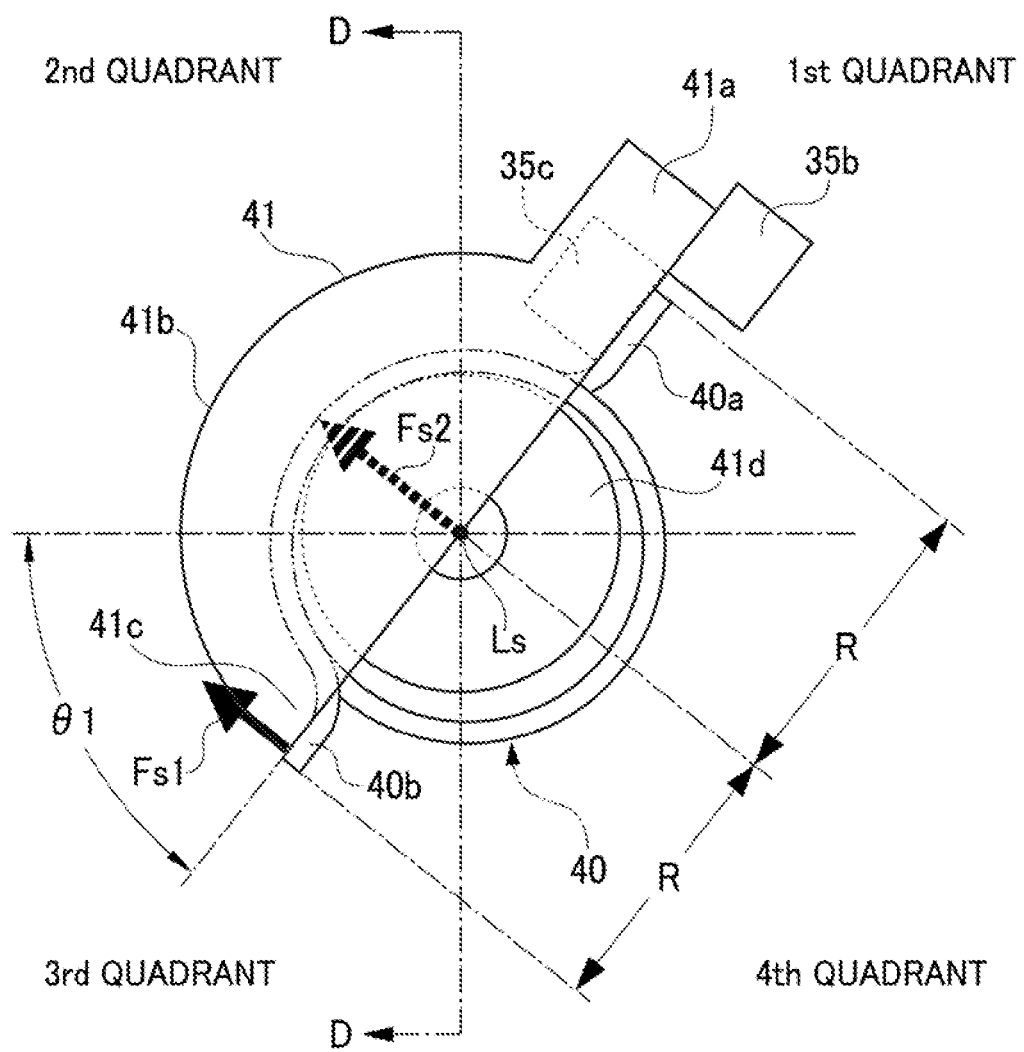
FIG. 12 is a schematic view showing forces acting on the main gear during non-operation of the motor and seen from a main gear side in a central axis direction of a rotary shaft.

In the above state, considering the relationship of forces in terms of a circumferential direction of, or around, the rotary shaft 15, the spring hook part 41c of the main gear 41 receives the return spring force Fs1 from the near-side hook 40b of the return spring 40 as shown in FIG. 12. As shown in FIG. 12, in a rectangular or Cartesian coordinate system consisting of an origin represented by the central axis Ls of the rotary shaft 15, an x-axis represented by a horizontal line, and a y-axis represented by a vertical line, a first quadrant is a part defined by a +x axis and a +y axis, a second quadrant is a part defined by a −x axis and the +y axis, a third quadrant is a part defined by the −x axis and a −y axis, and a fourth quadrant is a part defined by the +x axis and the −y axis. At that time, the far-side hook 40*a* and the full-close stopper part 41*a* are placed in a position corresponding to the first quadrant, and the near-side hook 40*b* and the spring hook part 41*c* are placed in a position corresponding to the third quadrant.

Herein, based on the principle of leverage, a fulcrum, or pivot point, is set at the full-close stopper part 41*a*, a point of effort is set at the spring hook part 41*c*, and a point of load is set at a middle part between the full-close stopper part 41*a* and the spring hook part 41*c*. Thus, the return spring force Fs1 applied to the spring hook part 41*c* causes a force Fs2 to act on the middle part between the full-close stopper part 41*a* and the spring hook part 41*c*. This is expressed by: "Force Fs2"=2×"Return spring force Fs1". In FIG. 12, the distance between the full-close stopper part 41*a* and the spring hook part 41*c* is set to "2R".

Figure 13:
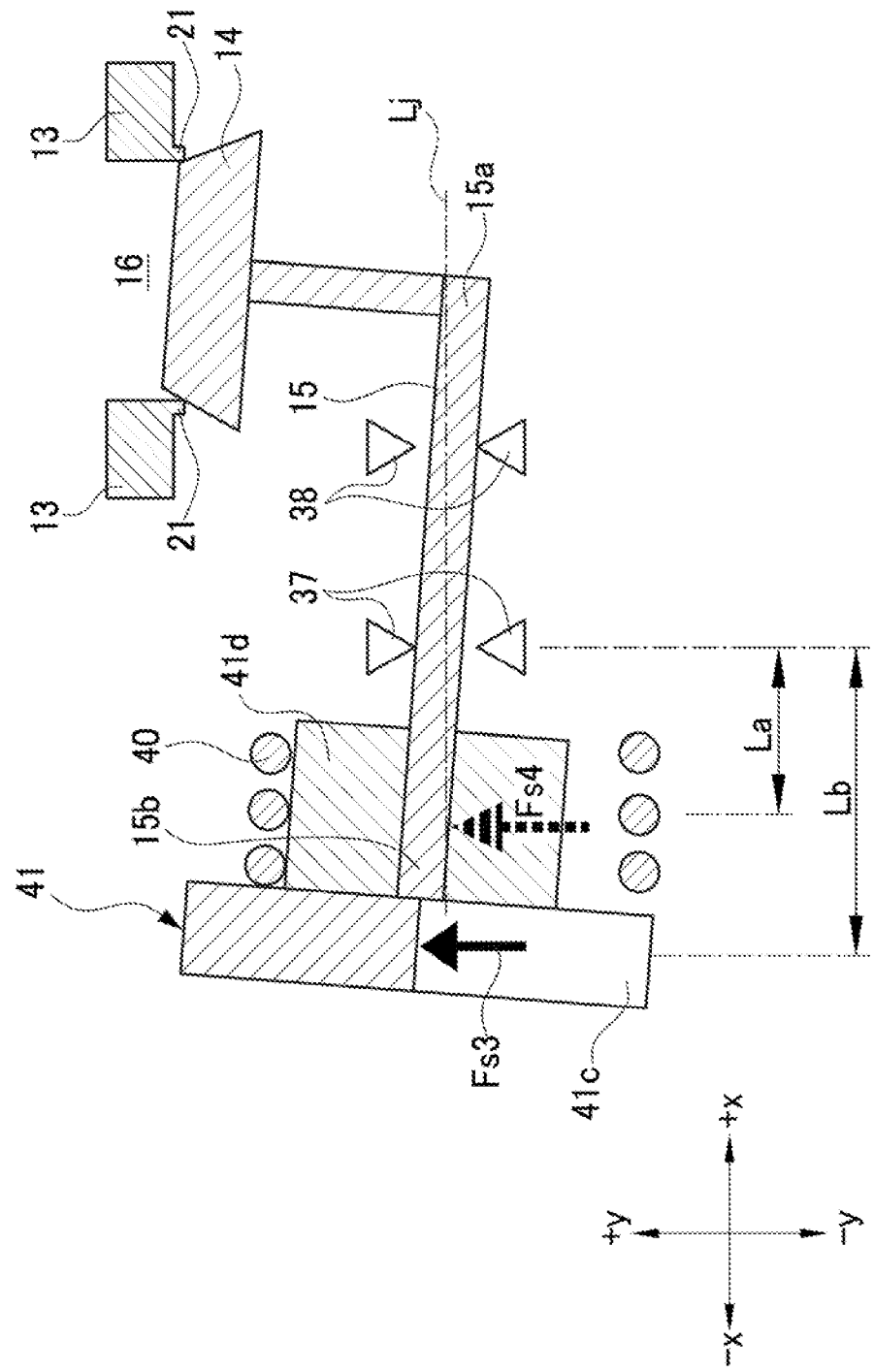
FIG. 13 is a schematic view representing the valve seat, the valve element, the rotary shaft, bearings, and the main gear, showing a cross-sectional view taken along a line D-D in FIG. 12.

At that time, considering the relationship of forces in terms of a cross section of the rotary shaft 15 taken along the central axis Ls, a +y direction component of the force Fs2 is a component force Fs3 as shown in FIG. 13. The +y direction is a direction perpendicular to the central axis Lj direction of the first bearing 37 and the second bearing 38 (the x direction) and is a direction in which the valve seat 13 is placed relative to the valve element 14 (an upward direction in the drawing sheets of FIGS. 12 and 13). This is expressed by: "Component force Fs3"="Force Fs2"×"sin θ1". The angle θ1 is an angle of the arrangement direction in which the full-close stopper part 41*a* and the spring hook part 41*c* are arranged with respect to the x direction as shown in FIG. 12.

This component force Fs3 causes a force Fs4 (a separating-direction urging force) to act in the +y direction on the spring guide part 41*d*. This is expressed by: "Force Fs4"="Component force Fs3"×Lb/La. In this way, the force Fs4 is a force that is caused by the return spring force Fs1 and acts in a direction perpendicular to the central axis Lj of the first bearing 37 and the second bearing 38. The distance La is a distance in the x direction from a position in which the first bearing 37 is placed to a position on which the force Fs4 acts. The distance Lb is a distance in the x direction from the position where the first bearing 37 is placed to a position on which the force Fs3 acts.

When the force Fs4 acts in the +y direction in the position of the spring guide part 41*d*, the rotary shaft 15 integral with the spring guide part 41*d* is caused to turn and incline clockwise in FIG. 13 about the first bearing 37 serving as the fulcrum. Accordingly, by the principle of leverage, the main gear 41 provided in the proximal end 15*b* of the rotary shaft 15 is moved in the +y direction, while the valve element 14 provided in the pin 15*a* of the rotary shaft 15 is moved in the −y direction. Therefore, the valve element 14 is moved in a direction away from the valve seat 13 (a separating direction). While the inlet sealing valve 174 is in a valve-closed state during non-operation of the motor 32, the valve element 14 is moved in the direction away from the valve seat 13 by the force Fs4 in the above manner. At that time, the rotary shaft 15 is restrained by the second bearing 38 from further inclining.

At that time, in the present embodiment, the valve element 14 is in contact with the rubber seat 21 (the seal member) provided in the valve seat 13 as shown in FIG. 13. Specifically, as shown in FIG. 21, the valve element 14 is in contact with the seal part 21*a* provided in the rubber seat 21. More concretely, the valve element 14 is in contact with the entire circumference of the seat surface 17 of the seal part 21*a*. The seal part 21*a* is configured to be deformable when pressed by the valve element 14. The seal part 21*a* has such a shape as to increase the surface pressure of a portion in contact with the seal surface 18 of the valve element 14 as the upstream-side pressure of the inlet sealing valve 174 becomes higher than the downstream-side pressure (that is, a front-rear differential pressure becomes larger). For instance, the seal part 21*a* may be a bead seal, a lip seal, or another type of seals. In this way, the rubber seat 21 closes (seals) between the valve seat 13 and the valve element 14. Thus, the inlet sealing valve 174 enhances the sealing performance with a simple structure.

Accordingly, during deceleration of a vehicle in which the fuel cell system 101 is mounted, when supply of air to the fuel cell stack 111 is to be stopped, the inlet sealing valve 174 is fully closed to increase the pressure in the air supply passage 161 or the stack pressure in the fuel cell stack 111 is decreased, thereby enabling sealing of the air on an inlet side of the fuel cell stack 111. Thus, when the supply of air to the fuel cell stack 111 is stopped, surplus (unnecessary) air is less supplied to the fuel cell stack 111. This can minimize unnecessary power generation in the fuel cell stack 111 during deceleration.

Figure 20:
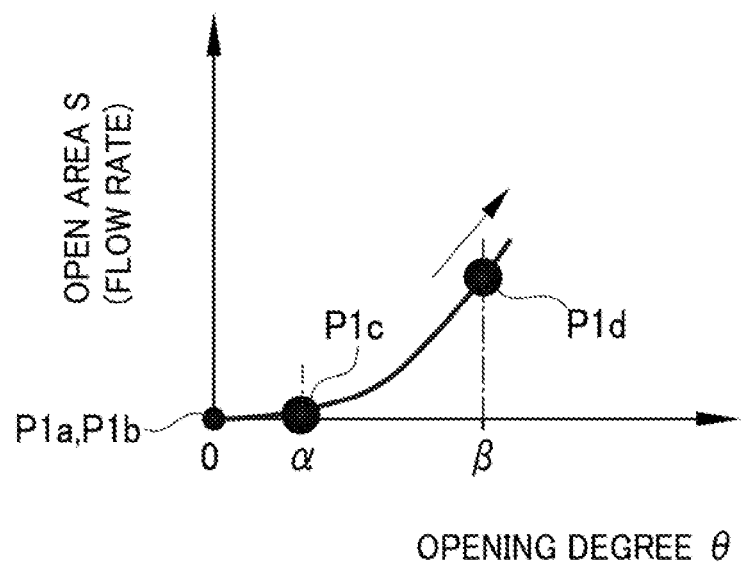
FIG. 20 is a graph showing a relationship between valve opening degree and open area.

At that time, the opening degree θ and the open area S establish the relationship as indicated by a point P1*a* in FIG. 20. Herein, the definition "when the inlet sealing valve 174 is in a fully-closed state (a mechanical fully-closed state)" means that the opening degree θ (the opening degree of the valve element 14) is 0, that is, the rotation angle of the rotary shaft 15 is an angle for full closure (a smallest angle within a rotation range of the rotary shaft 15).

Figure 14:
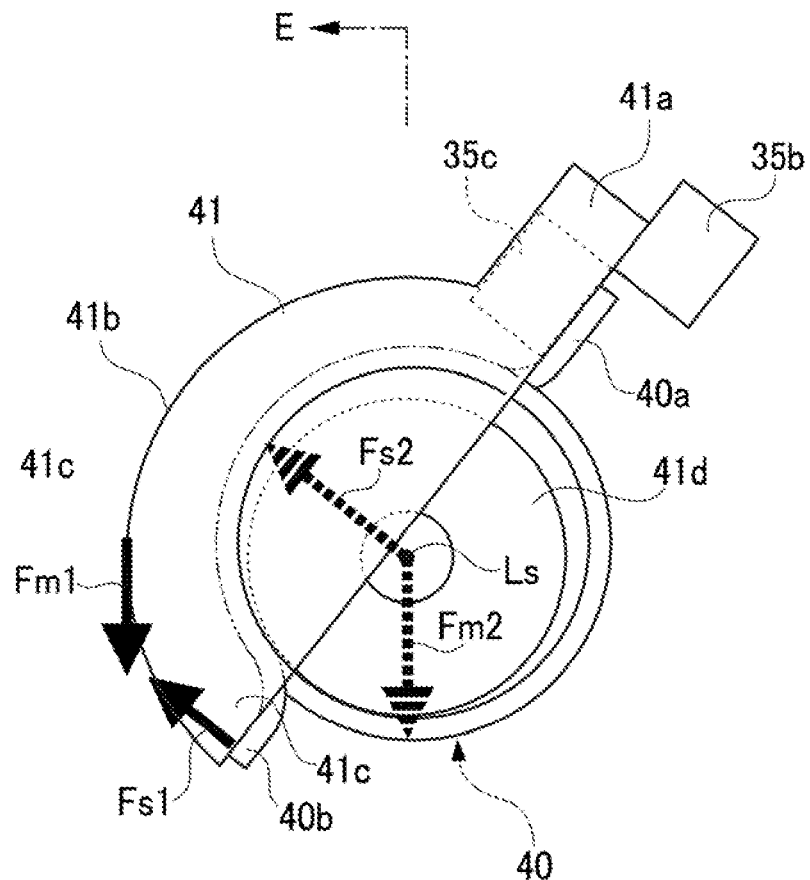
FIG. 14 is a schematic view showing forces acting on the main gear during operation of the motor and seen from the main gear side in the central axis direction of the rotary shaft.

Subsequently, while the motor 32 is driven by energization, the small-diameter gear 42*b* (see FIG. 11) of the intermediate gear 42 exerts the motor driving force Fm1 to the gear teeth part 41*b* (see FIG. 11) of the main gear 41 to cause rotation of the main gear 41. When seen from the force relationship in terms of the circumferential direction of the rotary shaft 15 at that time, the motor driving force Fm1 acts in the −y direction as shown in FIG. 14. This −y direction is a perpendicular direction to the central axis Lj direction (the x direction) of the first bearing 37 and the second bearing 38 and a direction in which the valve element 14 is placed relative to the valve seat 13 (a downward direction in the drawing sheets of FIGS. 12 and 13).

The motor driving force Fm1 causes the force Fm2 to act in the −y direction at the position of the central axis Ls of the rotary shaft 15. Further, when seen from the force relationship in terms of the cross section of the rotary shaft 15 taken along the central axis Ls, a force Fm3 (a seating-direction urging force) acts in the −y direction at the position of the spring guide part 41*d* as shown in FIG. 15. This is expressed by: "Force Fm3"="Force Fm2"×Lb/La. During operation of the motor 32, in the above manner, the force Fm3 is generated. This force Fm3 is a force that is caused by the motor driving force Fm1 and that acts in a direction perpendicular to the central axis Lj of the first bearing 37 and the second bearing 38. The force Fm3 causes the rotary shaft 15 to turn and incline about the first bearing 37 serving as the fulcrum, thereby urging the valve element 14 in a direction toward the valve seat 13.

Figure 15:
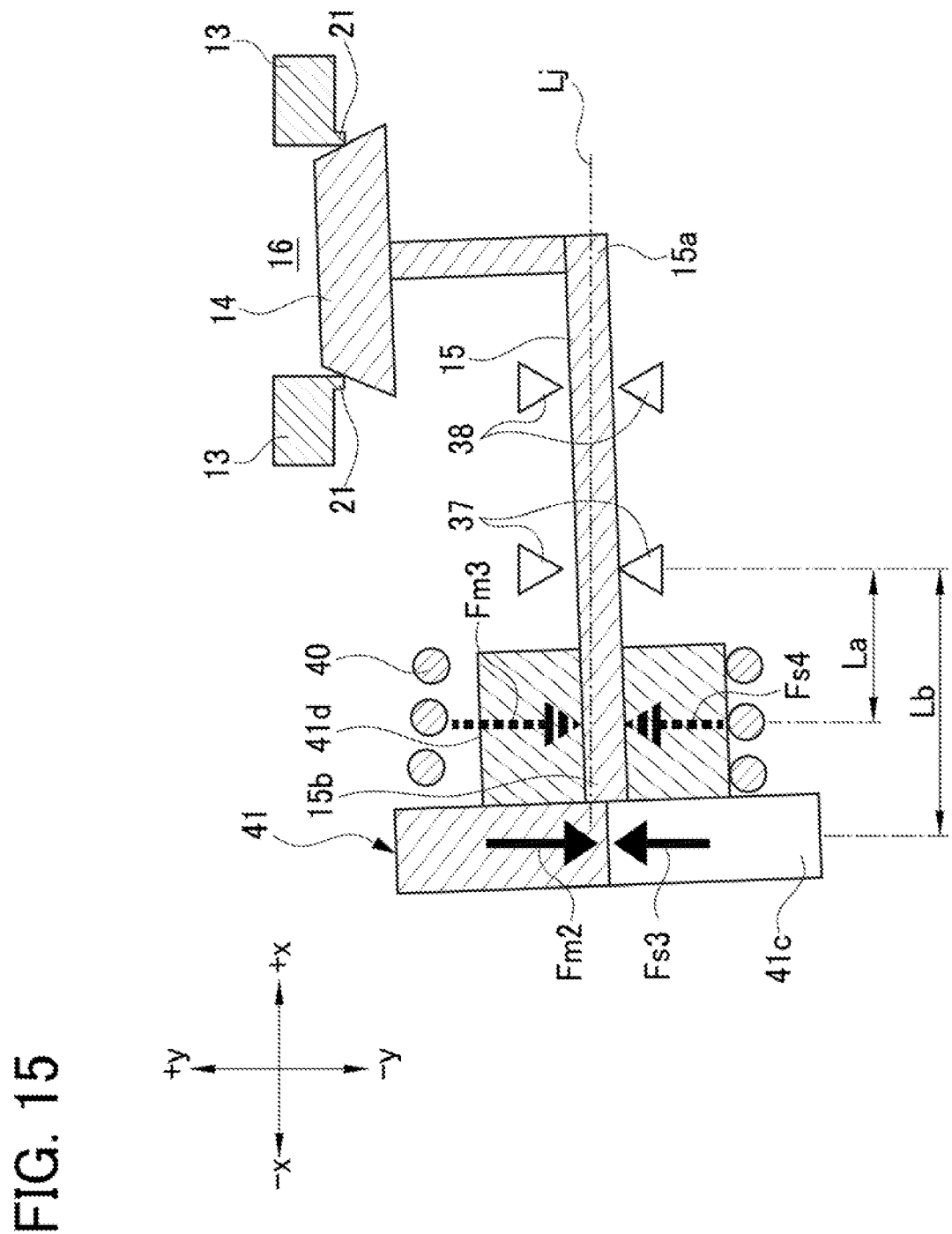
FIG. 15 is a schematic view representing the valve seat, the valve element, the rotary shaft, the bearings, and the main gear, showing a cross-sectional view taken along a line E-E in FIG. 14.

As shown in FIG. 15, when the force Fm3 becomes larger than the force Fs4, the rotary shaft 15 integral with the spring guide part 41*d* of the main gear 41 is caused to turn and incline counterclockwise in FIG. 15 about the first bearing 37 serving as the fulcrum. Accordingly, by the principle of leverage, the main gear 41 is moved in the −y direction, while the valve element 14 moves in the +y direction.

Therefore, the valve element 14 is moved in a direction toward the valve seat 13 (the seating direction) by the force Fm3.

In the present embodiment, at that time, the seal part 21*a* of the rubber seat 21 is pressed and deformed by the valve element 14. However, this seal part 21*a* is deformed within an elastic deformation region and is not plastically deformed. At that time, the relationship between the opening degree θ and the open area S is as indicated by a point P1*b* in FIG. 20.

Figure 16:
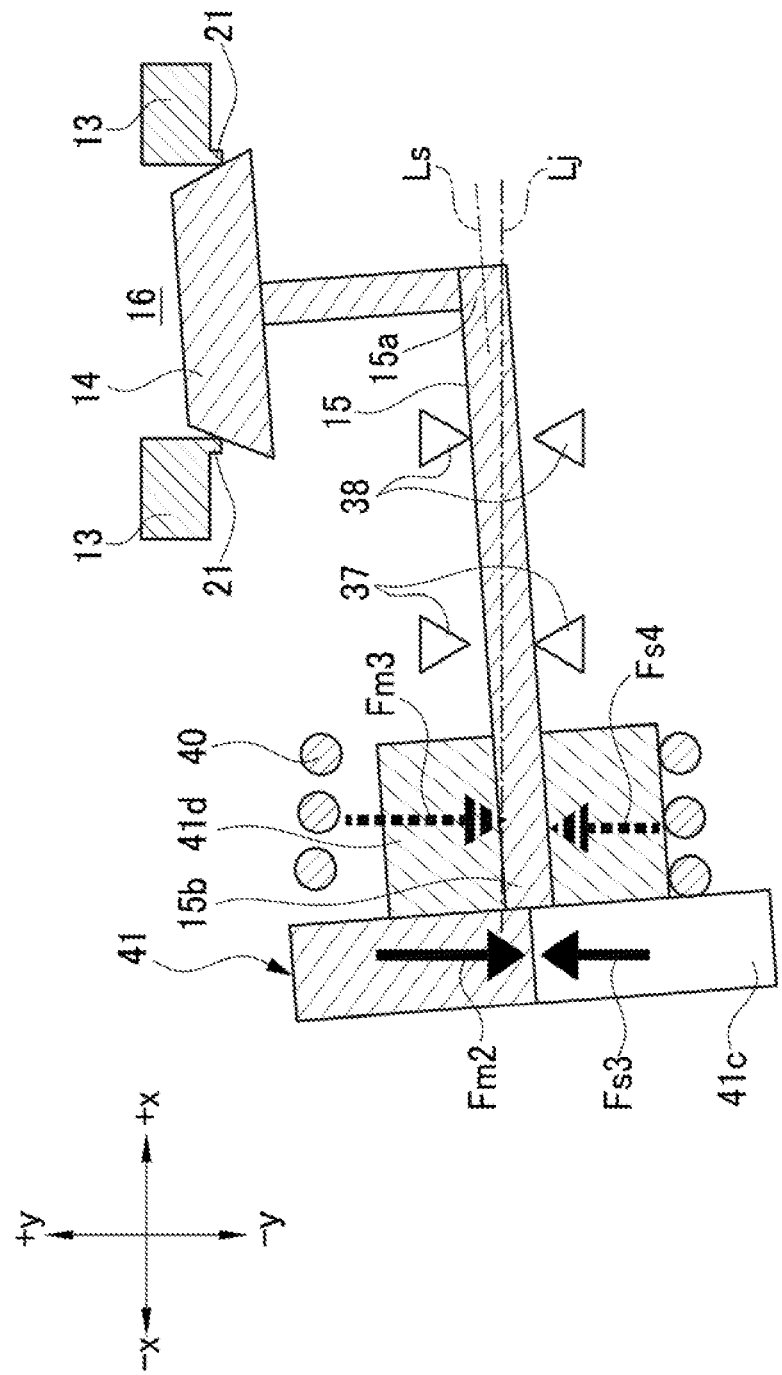
FIG. 16 is a diagram corresponding to FIG. 15 and representing a case where a motor driving force is set larger than that in FIG. 15.
Figure 17:
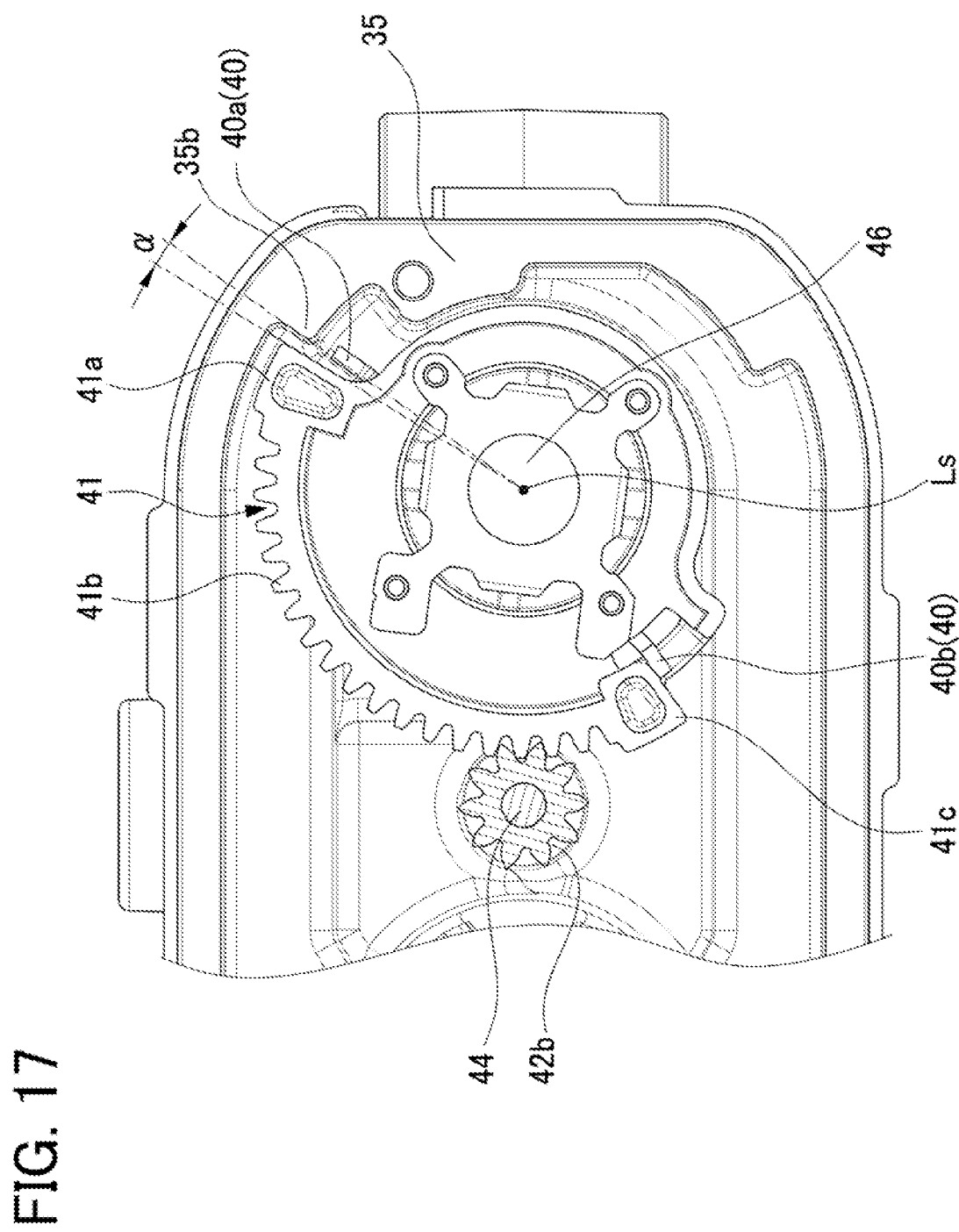
FIG. 17 is an enlarged view (a partially-cutaway view) of the main gear, the return spring, the intermediate gear, and their surrounding parts at a valve opening degree of a during operation of the motor.

Subsequently, when the drive voltage applied to the motor 32 rises and thus the motor driving force Fm1 become large, the rotary shaft 15 is caused to further turn and incline counterclockwise in FIG. 16 about the first bearing 37 serving as the fulcrum. Accordingly, the main gear 41 is further moved in the −y direction, while the valve element 14 is further moved in the +y direction. At that time, the rotary shaft 15 is rotated about the central axis Ls, so that the opening degree θ (the rotation angle of the rotary shaft 15) becomes an opening degree "α" (see FIG. 17) corresponding to a position slightly open from the opening degree 0°. In this state, the full-close stopper part 41*a* of the main gear 41 separates from the full-close stopper part 35*b* of the valve housing 35 as shown in FIG. 17. This state is a controlled fully-closed state which will be described later, in which the opening degree α is a controlled fully-closed opening degree. The details of the controlled fully-closed opening degree will be described later. As shown in FIG. 16, the rotary shaft 15 is stopped by the second bearing 38. At that time, the relationship between the opening degree θ and the open area S is changed as a point P1*c* in FIG. 20. The open area S is nearly zero.

Figure 18:
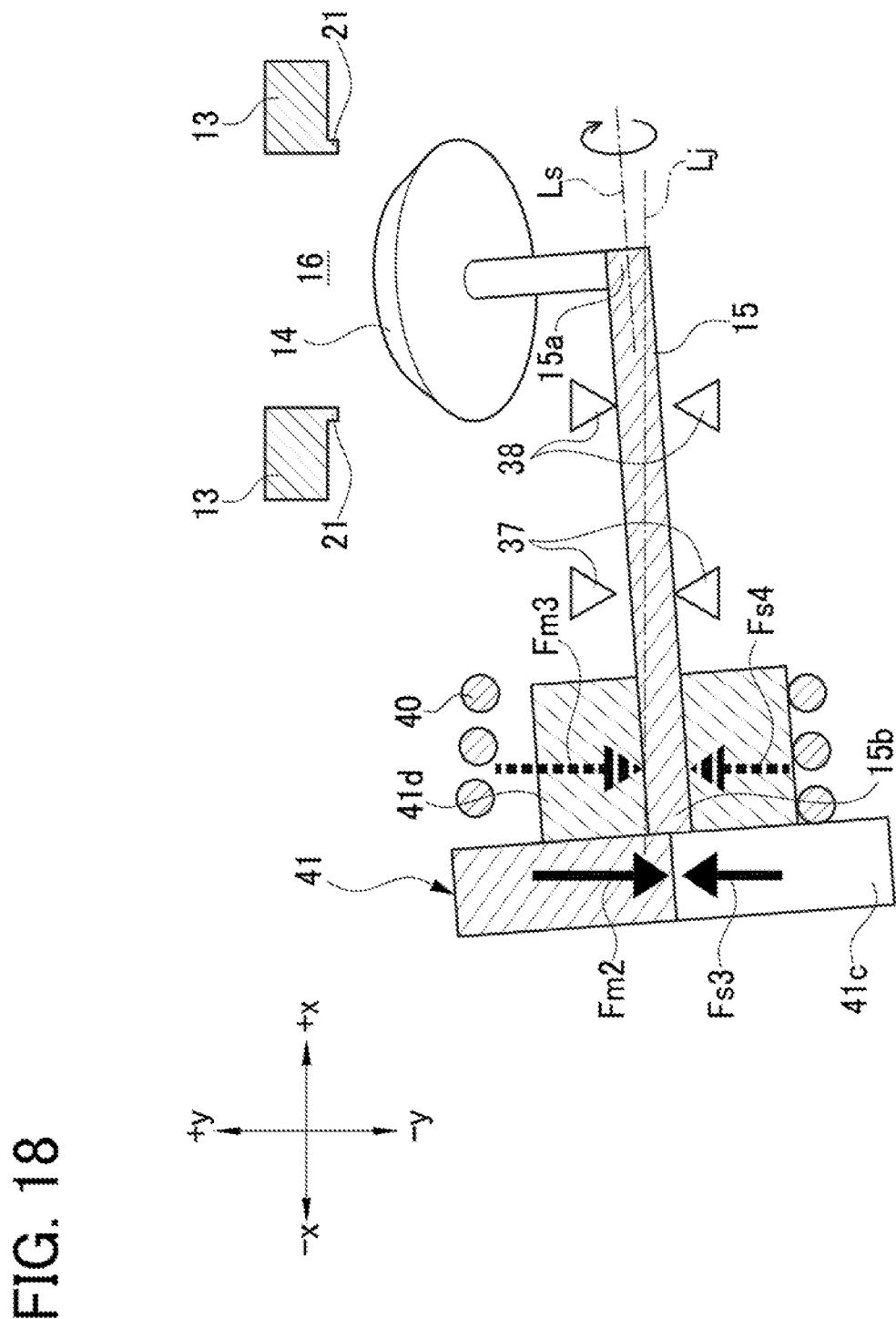
FIG. 18 is a diagram corresponding to FIG. 16 and representing a case where a motor driving force is set larger than that in FIG. 16.
Figure 19:
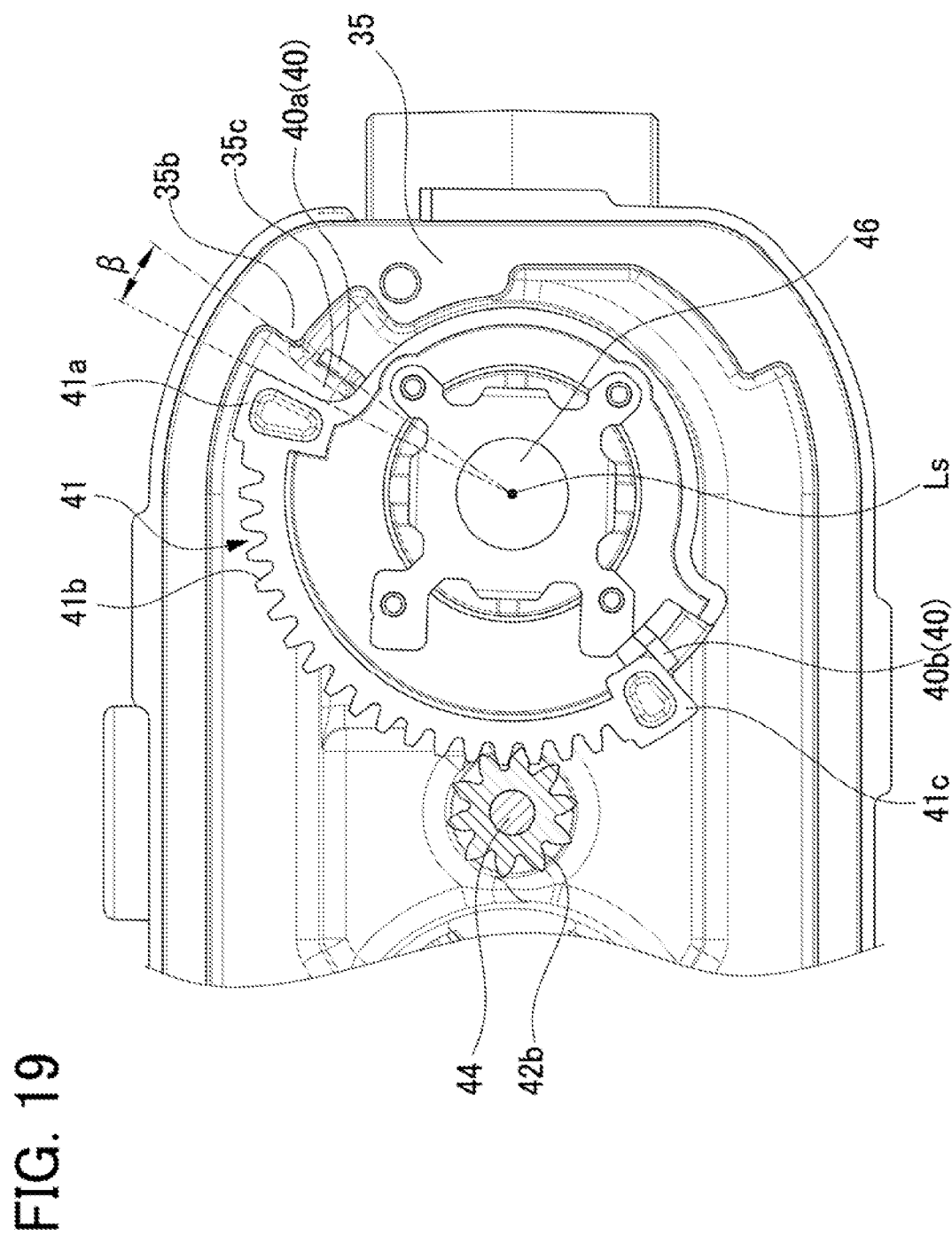
FIG. 19 is an enlarged view (a partially-cutaway view) of the main gear, the return spring, the intermediate gear, and their surrounding parts at a valve opening degree of β during operation of the motor.

Thereafter, as the motor driving force Fm1 becomes larger, the rotary shaft 15 is further rotated about the central axis Ls, thereby causing the valve element 14 to separate from the valve seat 13 as shown in FIG. 18 to increase the open area S for valve-opening. At that time, the valve opening degree θ becomes "β" (see FIG. 19). Further, the relationship between the opening degree θ and the open area S at that time is established as indicated by a point P1*d* in FIG. 20. In the above manner, the valve opening operation of the inlet sealing valve 174 is performed by the motor driving force Fm1.

Figure 22:
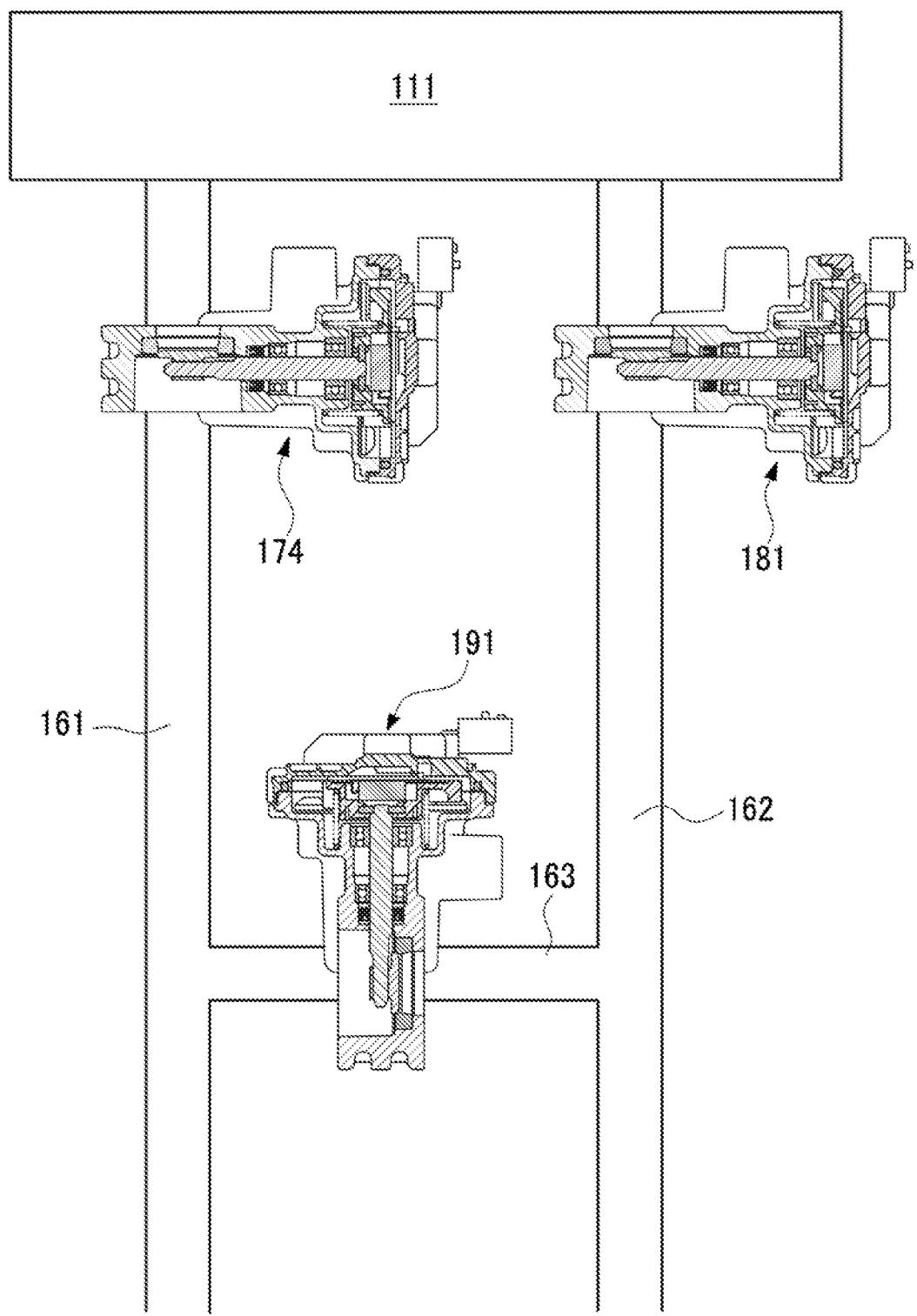
FIG. 22 is a schematic configuration view of an air system.

The outlet integration valve 181 is also configured as above except for the following configuration. Specifically, in the outlet integration valve 181, the seal part of the rubber seat is configured to decrease the surface pressure of a portion in contact with the seal surface of the valve element as the upstream-side pressure of the outlet integration valve 181 becomes larger than the downstream-side pressure. The bypass valve 191 is also configured as above except for the absence of the rubber seat 21. In the air system 113, as described above, the eccentric valves basically identical in structure are used for the inlet sealing valve 174, the outlet integration valve 181, and the bypass valve 191 as shown in FIG. 22 to allow commonality of valves in the air system 113, except that the inlet sealing valve 174 and the outlet integration valve 181 are different in structure of the rubber seat and the bypass valve 191 includes no rubber seat. Further, since the inlet sealing valve 174, the outlet integration valve 181, and the bypass valve 191 are common in structure except for the rubber seats, the opening and closing control (operation) itself is common and thus those valves can be controlled in cooperation. From the above-mentioned configuration, the fuel cell system 101 can be reduced in cost and the controller 201 can be simplified in control of opening and closing the valves.

In the present embodiment, when the inlet sealing valve 174 is to be fully closed during system stop or deceleration, the valve element 14 is seated on the valve seat 13 by making the seal surface 18 of the valve element 14 slide on the seal part 21*a* of the rubber seat 21. As wear of the seal part 21*a* due to sliding contact of the seal surface 18 develops, accordingly, the inlet sealing valve 174 cannot provide high sealing performance. During system stop, if the sealing performance of the inlet sealing valve 174 cannot be ensured, the seal-off degree of the fuel cell stack 111 during system stop may be decreased, causing a reaction in the fuel cell stack 111 and deterioration by oxidation in the fuel cell stack 111.

In the fuel cell system 101, therefore, when supply of air to the fuel cell stack 111 is stopped during deceleration or system stop, the following control on the basis of the aforementioned control is preferably executed to suppress wear of the seal part 21*a* to enhance the sealing performance of the inlet sealing valve 174 during system stop in order to prevent degradation of the fuel cell stack 111.

Figure 23:
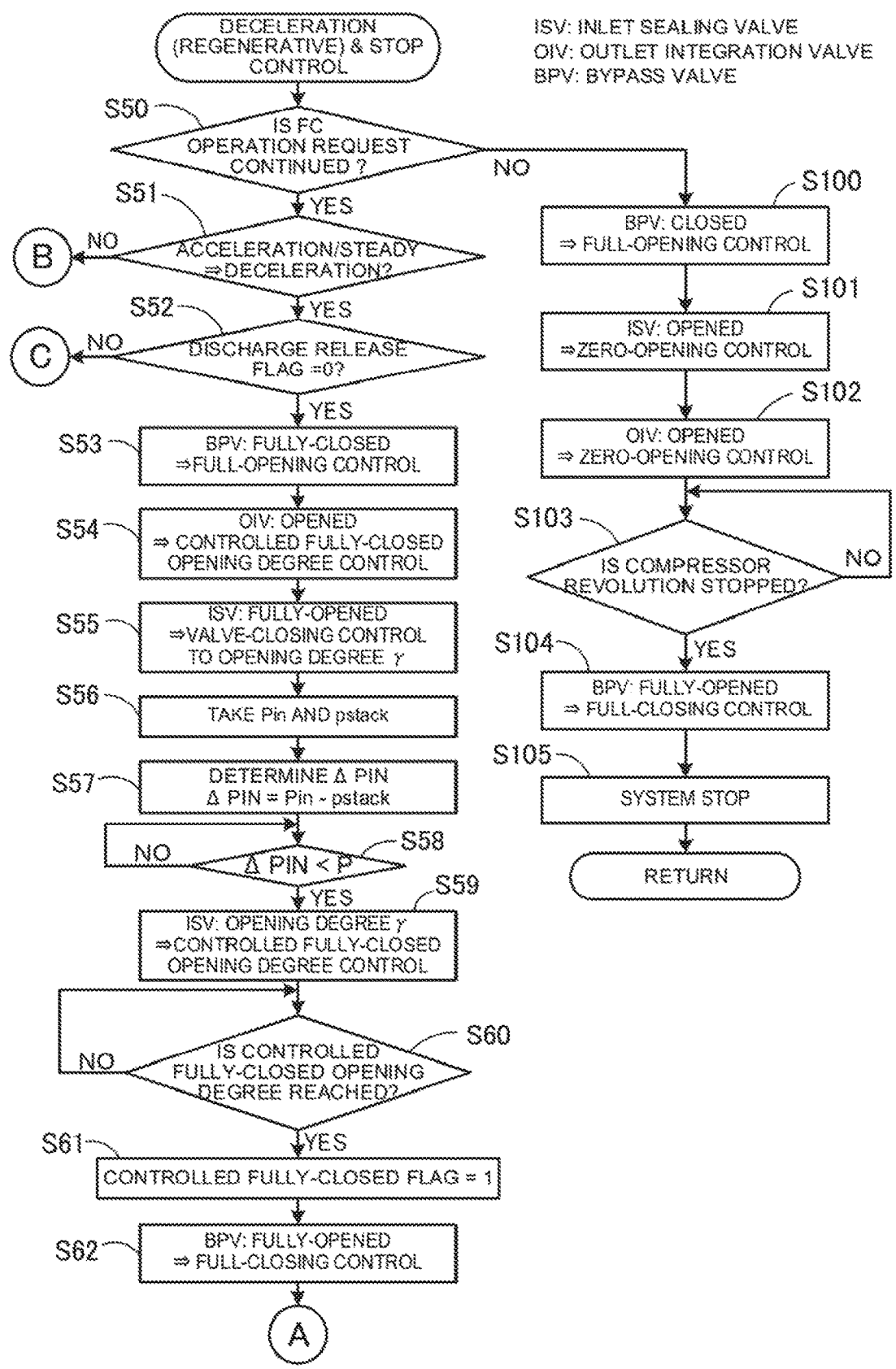
FIG. 23 is a flowchart showing control contents during deceleration and system stop.
Figure 24:
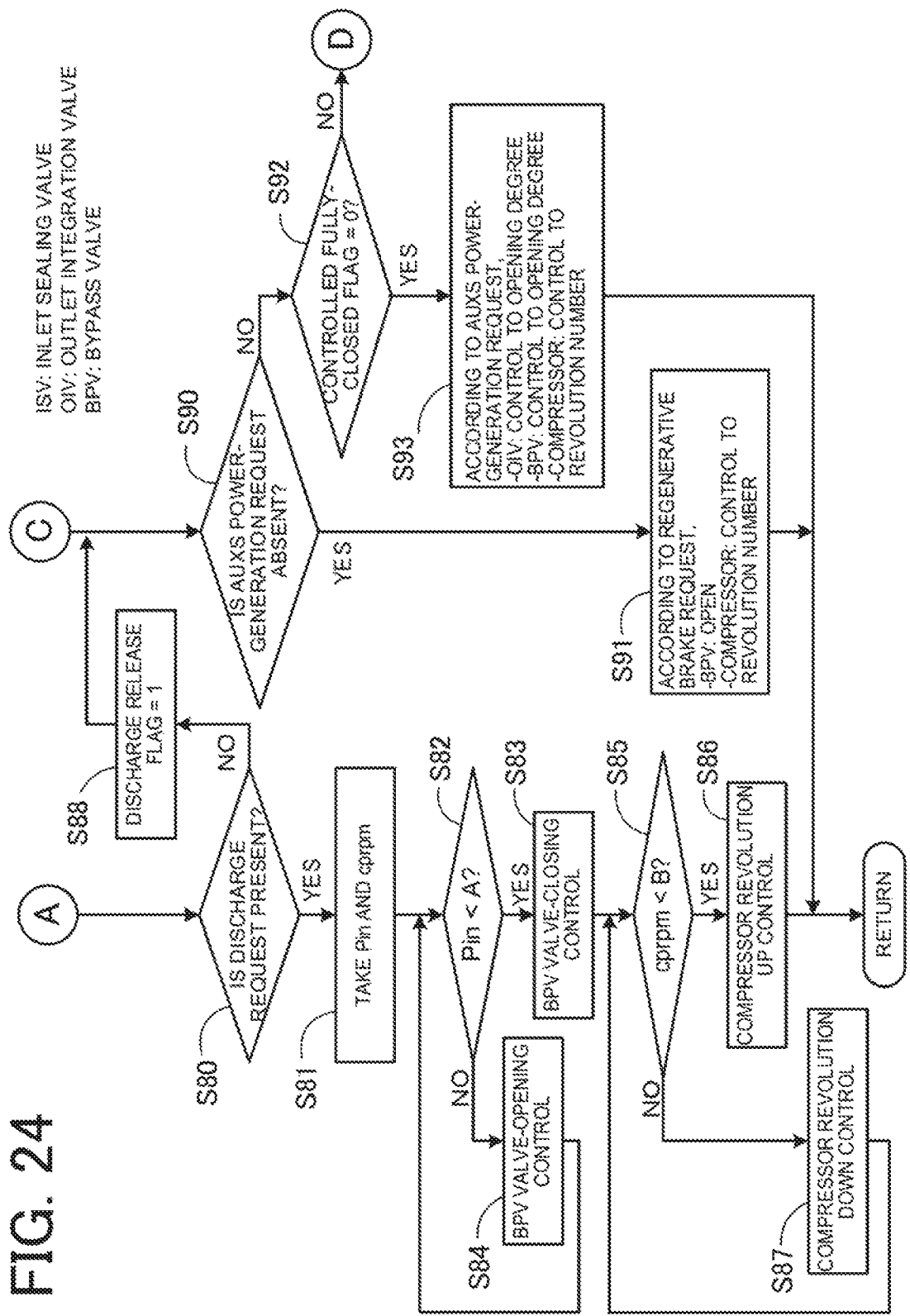
FIG. 24 is a flowchart showing contents of discharge control and regenerative control during deceleration.
Figure 25:
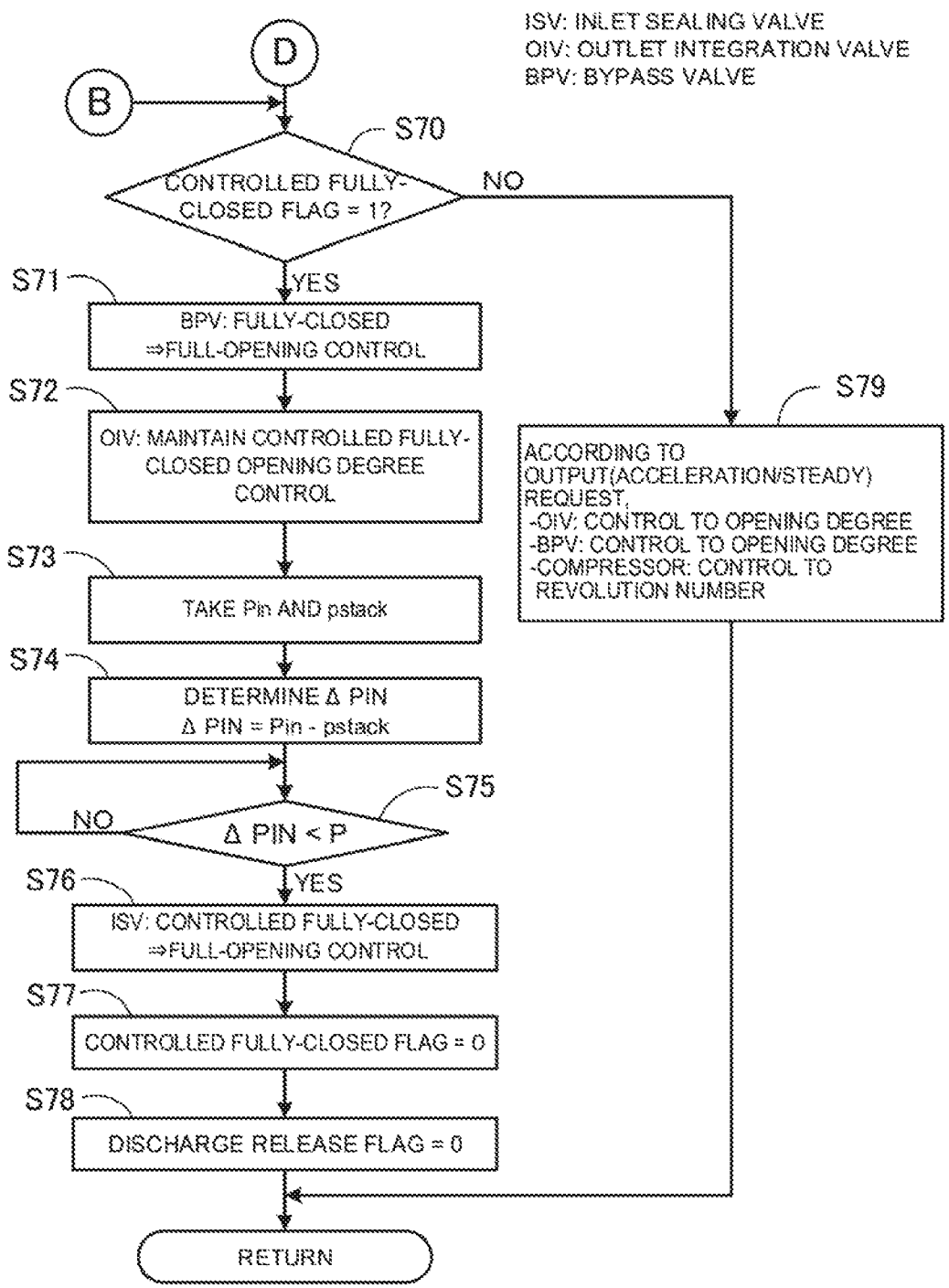
FIG. 25 is a flowchart showing control contents at the completion of deceleration and during acceleration/steady state operation.

To be concrete, the controller 201 has only to execute the control based on control flowcharts in FIGS. 23 to 25. The controller 201 firstly determines whether or not an operation request to the fuel cell stack 111 is continued (step S50). When this operation request to the fuel cell stack 111 is continued (step S50: YES), the controller 201 then determines whether or not the vehicle changes from the acceleration/steady state to the deceleration state (step S51).

When the vehicle changes from the acceleration/steady state to the deceleration state (step S51: YES), the controller 201 determines whether or not a discharge release flag is 0 (step S52). This discharge release flag being "0" indicates the presence of the request, while the discharge release flag being "1" indicates the absence of the request. The discharge request is generated when the electric power generated in the fuel cell stack 111 during deceleration cannot be charged to the battery.

When the discharge release flag is 0 (step S52: YES), the controller 201 performs the full-opening control to fully open the bypass valve 191 from the fully-closed state (step S53). Accordingly, the compressor pressure of the compressor 172 no longer acts on the inlet sealing valve 174, resulting in a decrease in the front-rear differential pressure of the inlet sealing valve 174. When the discharge release flag is 1 (step S52: NO), the controller 201 carries out the processings in steps S90 to S93 mentioned later.

Further, controlled fully-closed opening-degree control is executed to close the outlet integration valve 181 from the opening degree meeting the output (acceleration/steady) request before deceleration to a controlled fully-closed opening degree α (step S54). It is to be noted that the processing in this step S54 may be omitted. However, when the processing in step S54 is performed in addition to the processing step S53, the front-rear differential pressure of the inlet sealing valve 174 can be reduced even if either valve, that is, the bypass valve or the outlet integration valve, is broken down (bypass valve closing failure or outlet integration valve opening failure).

Furthermore, the controller 201 performs the valve-closing control that closes the inlet sealing valve 174 from the fully-opened state to a predetermined opening degree γ (step S55). This predetermined opening degree γ may be set to an opening degree (e.g., in the order of 5 to 15°) corresponding to a position slightly before the valve element 14 contacts with the seal part 21*a*. In the present embodiment, the predetermined opening degree γ is set to 10°.

The controller 201 then takes the compressor pressure (Pin) of the compressor 172 and the stack pressure pstack (step S56) and calculates a front-rear differential pressure ΔPIN (=Pin−pstack) of the inlet sealing valve 174 (step S57). When this front-rear differential pressure ΔPIN is smaller than a predetermined pressure P (step S58: YES), the controller 201 performs the controlled fully-closed opening-degree control that adjusts the opening degree of the inlet sealing valve 174 to a controlled fully-closed opening degree (step S59). Concretely, the controller 201 controls the motor 32 to close the inlet sealing valve 174 to the controlled fully-closed opening degree α. Thus, the opening degree of the inlet sealing valve 174 is changed from the predetermined opening degree γ to the controlled fully-closed opening degree α.

The controlled fully-closed opening degree α is an opening degree which is slightly larger than the mechanical fully-closed opening degree (Opening degree=) 0° and at which the valve element 14 is maintained in the valve-closed state in contact with the seal part 21a; for example, the opening degree α may be set to several degrees. In the present embodiment, the controlled fully-closed opening degree α is set to 3°. The predetermined pressure P may be set to a pressure value (about several kPa) under which the seal part 21a of the rubber seat 21 is never deformed.

At that time, since the bypass valve 191 has been fully opened, the front-rear differential pressure ΔPIN of the inlet sealing valve 174 is basically small. However, for a bypass valve 191 having a small valve hole, for example, it takes time from when the bypass valve 191 is opened until the front-rear differential pressure ΔPIN of the inlet sealing valve 174 becomes small. This may cause the inlet sealing valve 174 to be adjusted to the controlled fully-closed opening degree α before the front-rear differential pressure ΔPIN of the inlet sealing valve 174 decreases. Thus, the inlet sealing valve 174 may be brought into the controlled fully-closed state while the seal part 21a remains deformed.

Therefore, when the inlet sealing valve 174 is to be brought into the controlled fully-closed state, the inlet sealing valve 174 is firstly closed to the predetermined opening degree γ, as mentioned above and, after the front-rear differential pressure ΔPIN of the inlet sealing valve 174 becomes smaller than the predetermined pressure P, the controlled fully-closed opening-degree control is performed. This can reliably avoid the inlet sealing valve 174 from being brought into the controlled fully-closed state while the seal part 21a remains deformed.

Thereafter, the controller 201 determines whether or not the opening degree of the inlet sealing valve 174 having been subjected to the controlled fully-closed opening-degree control executed in step S59 has reached the controlled fully-closed opening degree α (step S60). When it is confirmed that the opening degree of the inlet sealing valve 174 has reached the controlled fully-closed opening degree α (step S60: YES), the controller 201 sets a controlled fully-closed flag of the inlet sealing valve 174 to 1 (step S61) and performs the full-closing control to fully close the bypass valve 191 from the fully-opened state (step S62). Thus, the compressor pressure of the compressor 172 acts on the seal part 21a of the inlet sealing valve 174, thereby pressing the seal part 21a against the valve element 14. Therefore, the inlet sealing valve 174 can enhance the sealing performance even when the opening degree is controlled to the controlled fully-closed opening degree α. Accordingly, at the time of stopping supply of air to the fuel cell stack 111 during deceleration, even when the inlet sealing valve 174 is brought into the controlled fully-closed state without being mechanically fully closed, the inlet sealing valve 174 can seal out the air.

Figure 26:
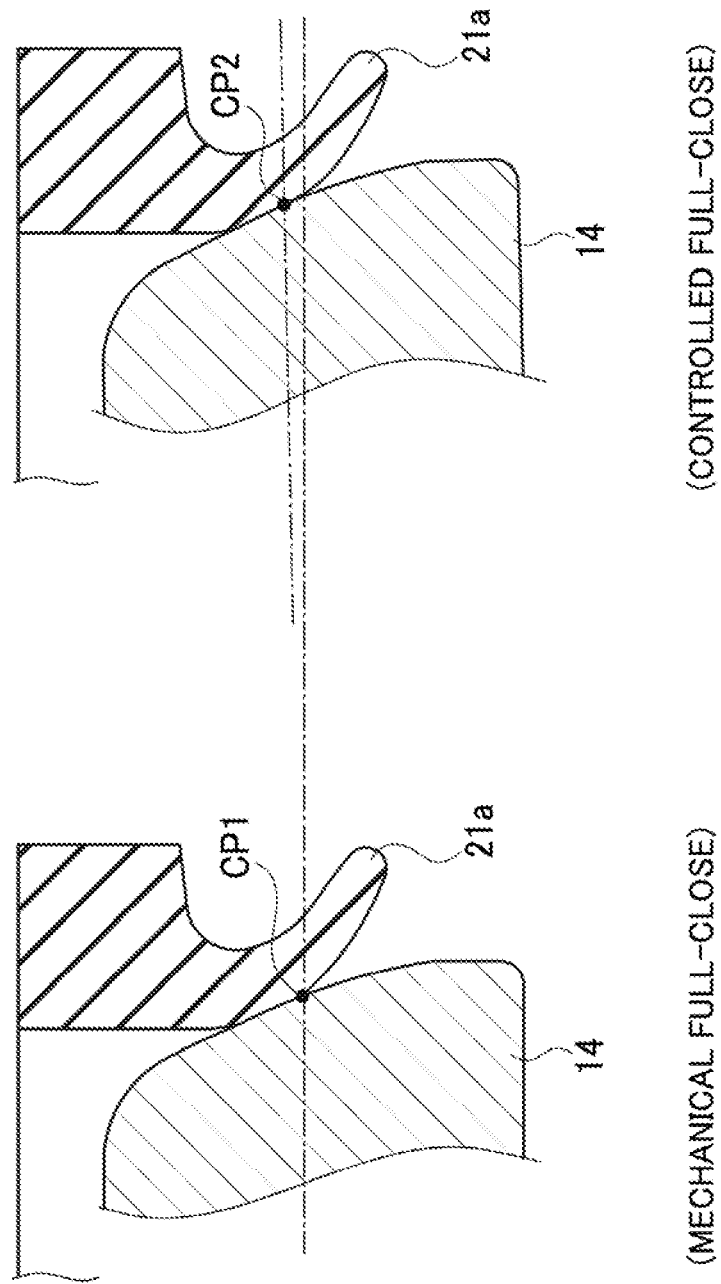
FIG. 26 is a view showing a contact state between the valve element and the seal part in each of a mechanical fully-closed state and a controlled fully-closed state.

In the inlet sealing valve 174, as described above, the fully-closed opening degree (controlled fully-closed opening degree) during deceleration is different from the fully-closed opening degree (mechanical fully-closed opening degree) during system stop. Therefore, as shown in FIG. 26, the position of a contact point CP1 between the valve element 14 and the seal part 21a in the mechanical fully-closed opening degree state during system stop and the position of a contact point CP2 between the valve element 14 and the seal part 21a in the controlled fully-closed opening degree state during deceleration are different from each other. During deceleration in which the inlet sealing valve 174 is operated to be fully closed with high frequency, the seal part 21a may wear away at the fully-closed opening degree position (the controlled fully-closed opening degree position: Opening degree θ=α). In contrast, during system stop in which the inlet sealing valve 174 is less operated as compared with during deceleration, wear of the seal part 21a at the fully-closed opening degree position (the mechanical fully-closed opening degree position: Opening degree θ=0) can be greatly reduced. Accordingly, the inlet sealing valve 174 can enhance the sealing performance during system stop. In the inlet sealing valve 174, even when the seal part 21a has worn away at the controlled fully-closed opening degree position, the seal part 21a is pressed against the valve element 14 by the compressor pressure of the compressor 172 during deceleration. Thus, high sealing performance can be achieved.

When the discharge request is present (step S80: YES), as shown in FIG. 24, the controller 201 takes the compressor pressure (Pin) and the number of compressor revolutions (cprpm) of the compressor 172 (step S81). The controller 201 then determines whether or not the compressor pressure (Pin) is smaller than a discharge target pressure A (Pin<A) (step S82). When the compressor pressure (Pin) is smaller than the discharge target pressure A (step S82: YES), the controller 201 controls the bypass valve 191 to close to increase the compressor pressure (Pin) (step S83). When the compressor pressure (Pin) is equal to or larger than the discharge target pressure A (step S82: NO), the controller 201 controls the bypass valve 191 to open to decrease the compressor pressure (Pin) (step S84).

The controller 201 then determines whether or not the compressor revolution number (cprpm) is smaller than the discharge target revolution number B (cprpm<B) (step S85). When the compressor revolution number (cprpm) is smaller than the discharge target revolution number B (step S85: YES), the controller 201 increases the number of revolutions of the compressor 172 (step S86). When the compressor revolution number (cprpm) is equal to or larger than the discharge target revolution number B (step S85: NO), the controller 201 decreases the number of revolutions of the compressor 172 (step S87).

By the aforementioned discharge control, it is possible to control the compressor pressure and the compressor revolution number respectively to around the discharge target pressure A and around the discharge target revolution number B to thereby cause the compressor 172 to efficiently discharge surplus electric power generated in the fuel cell stack 111.

In contrast, when the discharge request is absent, that is, when charging of the battery is enabled (step S80: NO), the controller 201 sets the discharge release flag to 1 (step S88). The controller 201 then determines whether an auxiliaries (AUXS) power-generation request is absent (step S90). When the AUXS power-generation request is absent (step S90: YES), the controller 201 performs the regenerative brake control, and opens the bypass valve 191 and controls the number of revolutions of the compressor 172 according to the regenerative brake request in order to charge the electric power generated in the fuel cell stack 111 to the battery. Since the bypass valve 191 is open, even when the compressor 172 is maintained at the constant revolution number, the load (power consumption) of the compressor 172 is low.

When the AUXS power-generation request is present (step S90: NO), the controller 201 determines whether or not the controlled fully-closed flag is 0 (step S92). When the controlled fully-closed flag of the inlet sealing valve 174 is 0 (step S92: YES), the controller 201 controls the opening degree of the outlet integration valve 181 and the opening degree of the bypass valve 191 individually and also controls the number of revolutions of the compressor 172 according to the AUXS power-generation request (step S93). When the controlled fully-closed flag of the inlet sealing valve 174 is 1 (step S92: NO), the processings in step S70 and subsequent steps which will be described later are performed.

Returning to FIG. 23, when the acceleration/steady state is maintained or when deceleration is terminated (step S51: NO), as shown in FIG. 25, the controller 201 determines whether or not the controlled fully-closed flag of the inlet sealing valve 174 is 1 (step S70). When the controlled fully-closed flag is 1 (step S70: YES), return control from the deceleration control is performed. Specifically, the controller 201 executes the full-opening control to fully open the bypass valve 191 from the fully-closed state (step S71). At that time, the outlet integration valve 181 continuously undergoes the controlled fully-closed opening-degree control (step S72). If the processing in step S54 is omitted, the processing in step S72 is unnecessary.

Figure 27:
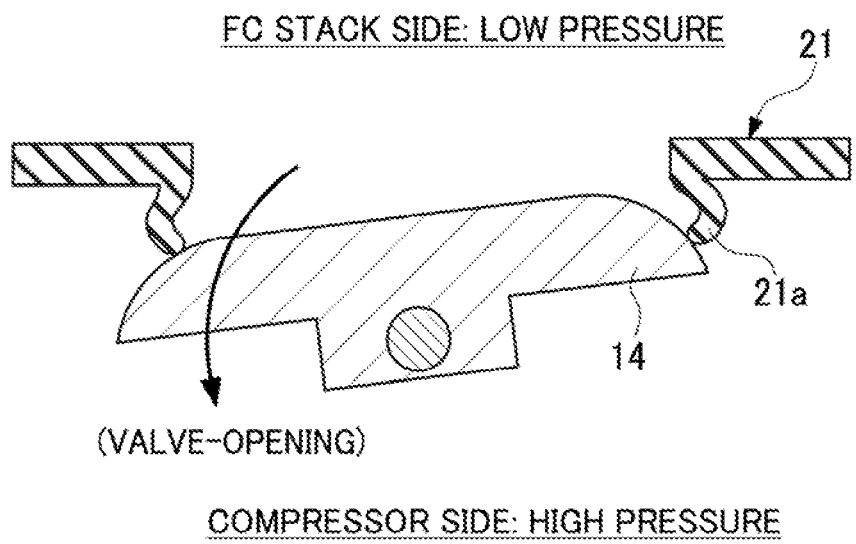
FIG. 27 is a view showing a state of a rubber seat with a seal part bent back during valve-opening.

At that time, when the front-rear differential pressure ΔPIN of the inlet sealing valve 174 is high, the seal part 21a of the rubber seat 21 may be bent back and deformed by the differential pressure. If the seal part 21a of the rubber seat 21 is bent or curled back in the course of opening the inlet sealing valve 174 as shown in FIG. 27, the seal part 21a may abnormally wear away. If the seal part 21a has abnormally worn away, the inlet sealing valve 174 cannot ensure the sealing performance during full-closing.

Therefore, the controller 201 takes the compressor pressure (Pin) of the compressor 172 and the stack pressure (pstack) (step S73) and calculates the front-rear differential pressure ΔPIN (=Pin−pstack) of the inlet sealing valve 174 (step S74). When the front-rear differential pressure ΔPIN is smaller than a predetermined pressure P (step S75: YES), the controller 201 performs the full-opening control that adjusts the opening degree of the inlet sealing valve 174 from the controlled fully-closed opening degree to a fully-opened opening degree (step S76). Thereafter, the controller 201 sets the controlled fully-closed flag of the inlet sealing valve 174 to 0 (step S77) and sets the discharge release flag to 0 (step S78).

Accordingly, the inlet sealing valve 174 is opened after the front-rear differential pressure ΔPIN of the inlet sealing valve 174 becomes small as above. This can reliably prevent the seal part 21a of the rubber seat 21 from being bent back and deformed during valve-opening of the inlet sealing valve 174. Therefore, when the inlet sealing valve 174 is to be opened after completion of deceleration, the inlet sealing valve 174 can prevent abnormal wear of the seal part 21a of the rubber seat 21 and thus can enhance the sealing performance of the inlet sealing valve 174.

When the controlled fully-closed flag is 0, that is, when the acceleration/steady state is maintained (step S70: NO), the inlet sealing valve 174 is kept in the fully-opened position. The controller 201 individually controls the opening degree of the outlet integration valve 181 and the opening degree of the bypass valve 191 according to the output (acceleration/steady) request at that time and also controls the number of revolutions of the compressor 172 (step S79).

Returning to FIG. 23, when the operation request of the fuel cell stack 111 is not continued, that is, when a system stop request is present (step S50: NO), the controller 201 executes the processings in step S100 and subsequent steps to stop the fuel cell system 101.

Figure 28:
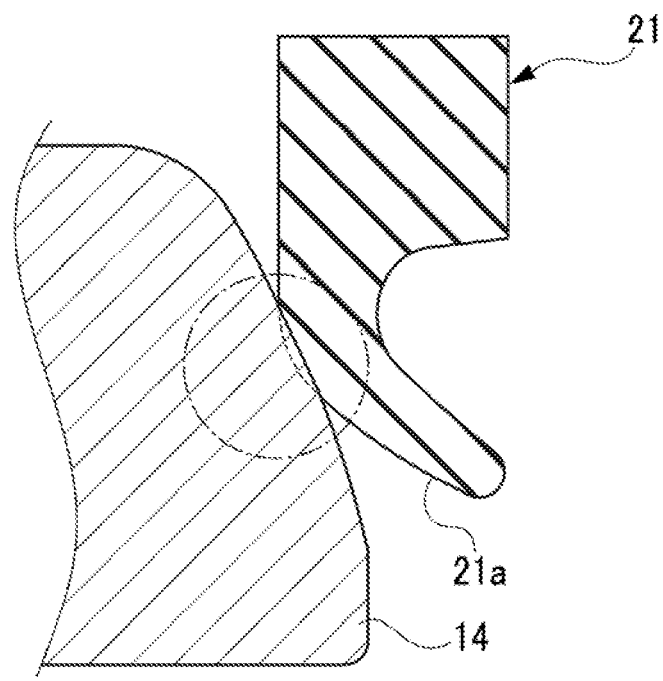
FIG. 28 is a view showing a manner that the valve element contacts with and slides on the seal part when controlled full-closing opening-degree control is executed.
Figure 29:
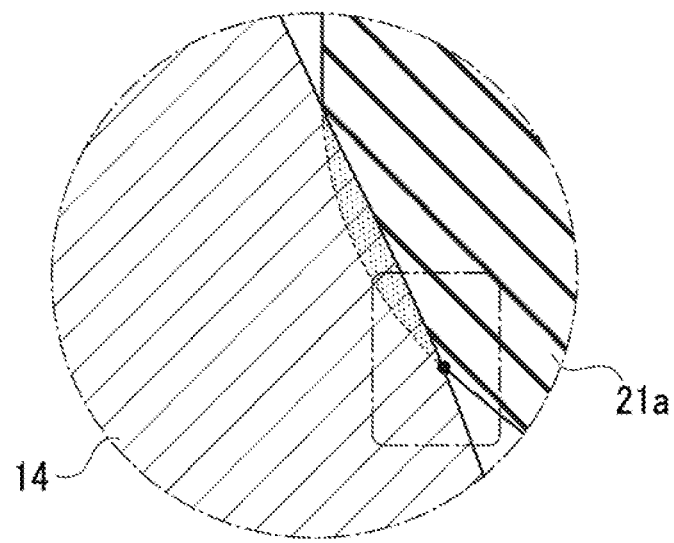
FIG. 29 is an enlarged view of an encircled part in FIG. 28.
Figure 30:
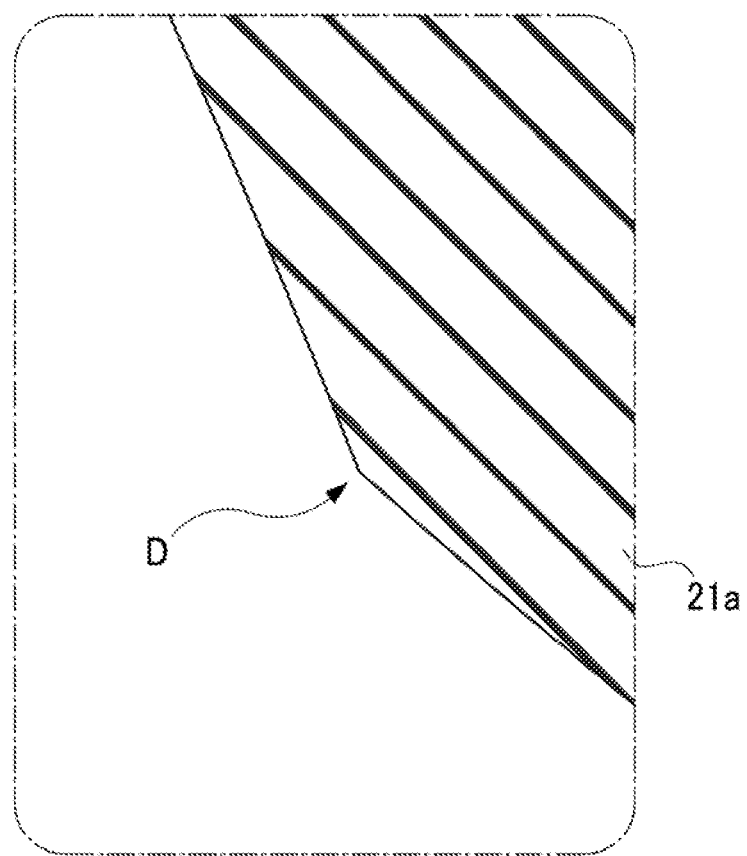
FIG. 30 is an enlarged view of a boxed part in FIG. 29.

Herein, when the controlled fully-closed opening-degree control is performed during deceleration, the number of times the valve element 14 slides on the seal part 21a is greatly increased at a controlled fully-closed opening degree position during deceleration shown in FIG. 28 than at a mechanical fully-closed opening degree position during system stop. Therefore, as shown in FIG. 29, a portion (hatched portion) of the seal part 21a that contacts and slides with respect to the valve element 14 at the controlled fully-closed opening degree position gets worn, which may cause a wear step or ridge D to be formed in the seal part 21a as shown in FIG. 30. When the wear step D is formed in the seal part 21a, during system stop, the inlet sealing valve 174 could not be closed to the mechanical fully-closed opening degree (Opening degree=0°) only by the urging force (the return spring force Fs1) of the return spring 40.

Therefore, when the system is to be stopped, the controller 201 performs the zero-opening control described below on the inlet sealing valve 174 to reliably bring the inlet sealing valve 174 to a fully-closed state (a mechanical fully-closed opening degree) during system stop.

Specifically, the controller 201 executes the full-opening control to fully open the bypass valve 191 from the fully-closed state (step S100). The controller 201 further performs the zero-opening control that controls the motor 32 to forcibly adjust the opening degree of the inlet sealing valve 174 to 0° to thereby bring the inlet sealing valve 174 to a fully-closed (a mechanical fully-closed) state (step S101). Similarly, the outlet integration valve 181 is subjected to the zero-opening control to be fully closed (step S102).

Subsequently, the controller 201 stops the compressor 172. When the revolution number becomes 0 (zero) (step S103: YES), the controller 201 performs the full-closing control that operates the bypass valve 191 from full open to full close (step S104) and stops the fuel cell system 101 (step S105).

Since the fuel cell system 101 is stopped as above, even when a wear step D occurs in the seal part 21a, the inlet sealing valve 174 can be reliably closed to the mechanical fully-closed opening degree by the motor 32. Further, the seal part 21a can be greatly suppressed from wearing away at the mechanical fully-closed position as described above. Accordingly, the inlet sealing valve 174 can enhance the sealing performance during system stop. In the present embodiment, furthermore, the outlet integration valve 181 is also configured to perform the zero-opening control as with the inlet sealing valve 174. Thus, the outlet integration valve 181 can also enhance the sealing performance during system stop. The seal-off degree of the fuel cell stack 111 during system stop can be enhanced. Thus, the reaction in the fuel cell stack 111 is less likely to occur and the deterioration due to oxidation in the fuel cell stack 111 can be suppressed.

Next, learning of controlled fully-closed position of the inlet sealing valve 174 will be described. When the inlet sealing valve 174 is to be fully closed during deceleration, as described above, the controller 201 performs the controlled fully-closed opening-degree control that adjusts the opening degree of the inlet sealing valve 174 to the controlled fully-closed opening degree α (see step S59 in FIG. 23). Herein, the controlled fully-closed opening-degree control is executed during deceleration in which the vehicle is operated with high frequency, so that the opening degree of the inlet sealing valve 174 becomes the controlled fully-closed opening degree α with high frequency. This increases the number of times the valve element 14 comes into contact with the seal part 21a of the rubber seat 21 provided in the valve seat 13, which may cause much wear of the seal part 21a. Accordingly, there is a demand to control the controlled fully-closed opening degree α in order to reduce wear of the seal part 21a.

In case the seal part 21a much wears away, causing air leakage to occur in the inlet sealing valve 174 when the opening degree of the inlet sealing valve 174 is adjusted to the controlled fully-closed opening degree α, unnecessary air is supplied to the fuel cell stack 111. In this case, the supplied unnecessary air reacts with hydrogen gas already supplied to the fuel cell stack 111, causing power generation, so that unnecessary electric power is generated in the fuel cell stack 111. If unnecessary electric power is much generated in the fuel cell, such an electric power could not be completely discharged only by power consumption of auxiliaries. As the power consumption of the compressor 172 needs to be increased, for example, the number of revolutions of the compressor 172 may increase or the pressure at an outlet of the compressor 172 may rise. These situations may deteriorate fuel consumption or generate noise vibration (NV).

Thus, the controlled fully-closed opening degree α is controlled according to the amount of wear of the seal part 21a, so that the amount of air leaking through the inlet sealing valve 174 can be kept zero during the controlled fully-closed opening-degree control. In the present embodiment, therefore, the air leakage amount in the inlet sealing valve 174 is determined based on the amount of electric power generated ("power generation amount") in the fuel cell stack 111 and thus the controlled fully-closed opening degree α is changed (learnt) to a valve-closing side (toward 0°). In the following description, the controlled fully-closed opening degree α is expressed as a controlled fully-closed opening degree $K\alpha^+$ for convenience.

Figure 31:
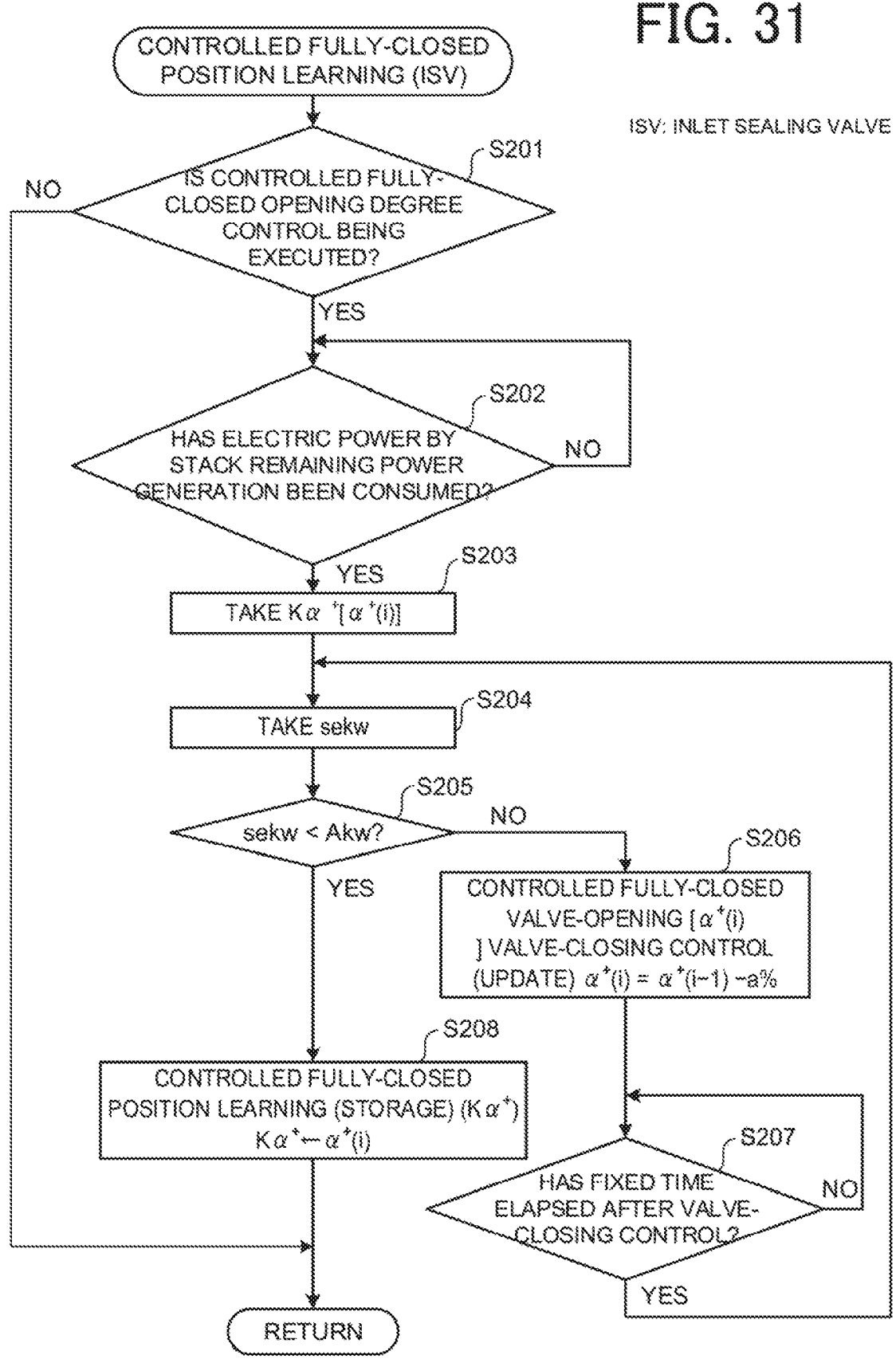
FIG. 31 is a flowchart showing contents of controlled fully-closed position learning.

To be concrete, the controller 201 performs the control shown in FIG. 31. As shown in FIG. 31, while the controlled fully-closed opening-degree control is being performed (step S201: YES), after electric power by stack remaining power generation is completely consumed (step S202: YES), the controller 201 takes a controlled fully-closed opening degree $K\alpha^+$ (an opening degree $\alpha^+(i)$) (step S203). The controlled fully-closed opening degree $K\alpha^+$ taken in step S203 is assumed as an opening degree $\alpha^+(i)$.

Herein, the condition "while the controlled fully-closed opening-degree control is being performed" is conceived as for example a situation that the inlet sealing valve 174 is fully closed during deceleration (step S59 in FIG. 23) as described above. However, not limited thereto, this condition may also include another situation that the inlet sealing valve 174 is fully closed during any operations except for during deceleration.

Further, the condition "electric power by stack remaining power generation" indicates the electric power generated in the fuel cell stack 111 with the air that remains in the fuel cell stack 111 when the controlled fully-closed opening-degree control is performed, starting stop of air supply to the fuel cell stack 111.

The controlled fully-closed opening degree $K\alpha^+$ (the opening degree $\alpha^+(i)$) is an opening degree that is slightly larger than the mechanical fully-closed opening degree (the opening degree 0°) at which the valve element 14 is in contact with the seal part 21a and maintained in a valve-closed state. For example, this opening degree is set to several degrees. In the present embodiment, the controlled fully-closed opening degree $K\alpha^+$ (the opening degree $\alpha^+(i)$) is set to 3° or smaller, in which the alphabet i is a positive integer.

The controller 201 successively takes a stack power generation amount sekw which is a power generation amount of the fuel cell stack 111 (step S204) and determines whether this stack power generation amount sekw is less than a predetermined power generation amount Akw (step S205). The predetermined power generation amount Akw is a power generation amount at which the power generation in the fuel cell stack 111 can be judged or regarded as being stopped; for example, 0 kW to several (e.g., 3) kW.

Herein, the fuel cell stack 111 is maintained in a rich (much) state with hydrogen gas. Thus, depending on whether or not air is supplied to the fuel cell stack 111, the fuel cell stack 111 performs or stops power generation. During execution of the controlled fully-closed opening-degree control, therefore, if no air leakage occurs in the inlet sealing valve 174, air supply to the fuel cell stack 111 is stopped and the power generation in the fuel cell stack 111 is thus stopped. If the power generation in the fuel cell stack 111 continues, it indicates that air is being supplied to the fuel cell stack 111. It is thus conceived that air leakage occurs in the inlet sealing valve 174.

In the present embodiment, therefore, the controller 201 is configured to determine the amount of air leaking through the inlet sealing valve 174 based on the stack power generation amount sekw. Herein, the stack power generation amount sekw is the amount of electric power generated in the fuel cell stack 111 after the air remaining in the fuel cell stack 111 at the start of the controlled fully-closed opening-degree control is consumed. The amount of air remaining in the fuel cell stack 111 at the start of the controlled fully-closed opening-degree control is obtained based on the flow rate of air flowing in the air supply passage 161 just before the start of the controlled fully-closed opening-degree control, for example, based on the number of revolutions of the compressor 172.

Accordingly, when the stack power generation amount sekw is determined to be the predetermined power generation amount Akw or larger (step S205: NO), it is conceived that air leakage occurs in the inlet sealing valve 174. Thus, the controller 201 performs a controlled fully-closed opening-degree valve-closing control, i.e., updates the controlled fully-closed opening degree (step S206). Herein, the "controlled fully-closed opening-degree valve-closing control" is a control that corrects, or updates, the opening degree $\alpha^+(i)$ (the controlled fully-closed opening degree) to the valve-closing side (toward 0°). To be concrete, the controller 201 makes a calculation using the following expression:

$$\alpha^+(i)=\alpha^+(i-1)-a\% \quad \text{(Exp. 1)}$$

wherein a %=0.01 to 0.1%.

After completion of the controlled fully-closed opening-degree valve-closing control in step S206 and further after a lapse of a fixed time t (e.g., several seconds (1 to 2 seconds)) (step S207: YES), the controller 201 takes a stack power generation amount sekw again (step S204).

When the stack power generation amount sekw is less than the predetermined power generation amount Akw (step S205: YES), it is conceived that no air leakage occurs in the inlet sealing valve 174, i.e., that the leakage amount is zero, the controller 201 performs the controlled fully-closed position learning, i.e., storage of the controlled fully-closed opening degree (step S208). In step S208, specifically, the controller 201 learns, i.e., corrects the controlled fully-closed opening degree $K\alpha^+$ to the opening degree $\alpha^+(i)$.

In the present embodiment as described above, during execution of the controlled fully-closed opening-degree control, after the electric power by the stack remaining power generation has been consumed, the controller 201 determines the air leakage amount in the inlet sealing valve 174 based on the stack power generation amount sekw. When it is determined that air leakage has occurred in the inlet sealing valve 174 since the stack power generation amount sekw is the predetermined power generation amount Akw or larger, the controller 201 further corrects the controlled fully-closed opening degree $K\alpha^+$ to the valve-closing side until reaching a zero-position opening degree at which the air leakage amount in the inlet sealing valve 174 becomes zero. In contrast, when the controller 201 determines that no air leakage has occurred in the inlet sealing valve 174, i.e., that the leakage amount is zero, because the stack power generation amount sekw is less than the predetermined power generation amount Akw, the controller 201 maintains the controlled fully-closed opening degree $K\alpha^+$.

According to the present embodiment described above, while the controlled fully-closed opening-degree control is in execution, when it is determined that air leakage has occurred in the inlet sealing valve 174, the controller 201 corrects the controlled fully-closed opening degree $K\alpha^+$ to the valve-closing side until reaching the zero-position opening degree at which the air leakage amount in the inlet sealing valve 174 becomes zero.

Accordingly, during execution of the controlled fully-closed opening-degree control, when air leakage occurs because of wear of the seal part 21a in the inlet sealing valve 174, the controller 201 corrects the controlled fully-closed opening degree $K\alpha^+$ to the valve-closing side according to the wear amount of the seal part 21a, so that the air leakage amount in the inlet sealing valve 174 can be reduced to zero. Thus, unnecessary air supply to the fuel cell stack 111 is reduced and thus unnecessary power generation in the fuel cell stack 111 can be prevented. Consequently, discharge by power consumption of auxiliaries is no longer necessary to consume the electric power generated by unnecessary power generation in the fuel cell stack 111. This can prevent deterioration of fuel consumption and occurrence of NV.

Herein, if the controlled fully-closed opening degree $K\alpha^+$ is set in advance to such an opening degree as to cause the surface pressure of the seal part 21a acting on the seal surface 18 of the valve element 14 to decrease, air leakage is likely to occur due to slight wear of the seal part 21a. In the present embodiment, however, the controlled fully-closed opening degree $K\alpha^+$ is controlled according to the wear amount of the seal part 21a, so that the surface pressure of the seal part 21a is decreased to reduce wear of the seal part 21a, that is, to enhance durability, and also the air leakage amount can be maintained at zero during the controlled fully-closed opening-degree control.

Furthermore, the controller 201 is configured to determine the air leakage amount in the inlet sealing valve 174 based on the stack power generation amount sekw. Thus, there is no need to further adopt a supplementary detection means, such as a sensor, for detecting the air leakage amount in the inlet sealing valve 174. Cost reduction can thus be achieved.

The stack power generation amount sekw is the amount of electric power generated after the air remaining in the fuel cell stack 111 at the start of the controlled fully-closed opening-degree control has been consumed. Thus, the stack power generation amount sekw becomes the power generation amount corresponding to the air leakage amount in the inlet sealing valve 174 generated while the controlled fully-closed opening-degree control is executed. The air leakage amount in the inlet sealing valve 174 can accordingly be determined based on the stack power generation amount sekw.

Next, learning of a controlled position of the outlet integration valve 181 for driving of auxiliaries ("AUXS-control position learning") will be described. At the time of an AUXS power-generation request, for example, when an AUXS power-generation request is present (step S90: NO) in FIG. 24, the controller 201 performs an AUXS power-generation opening-degree control that adjusts the opening degree of the outlet integration valve 181 to an AUXS power-generation opening degree corresponding to a request AUXS power-generation amount. The condition "at the time of an AUXS power-generation request" indicates the time when power generation in the fuel cell stack 111 is requested in order to drive auxiliaries, such as the compressor 172.

At that time, the AUXS power-generation opening degree is adjusted to a very small opening degree and thus the contact area between the valve element 14 and the seal part 21a is large. This state may cause wear of the seal part 21a and result in an increase in the flow rate (the leakage amount) of air in the outlet integration valve 181. Accordingly, the amount of air supplied to the fuel cell stack 111 increases, resulting in excessive power generation amount in the fuel cell stack 111. For consumption of this unnecessary electric power, fuel consumption deteriorates and the auxiliaries need to be driven unnecessarily.

In the present embodiment, therefore, based on the stack power generation amount sekw obtained while the control of the outlet integration valve 181 for auxiliaries ("AUXS control") is being executed, the controller 201 determines that the air flow rate increases due to wear of the seal part 21a in the outlet integration valve 181, as with the inlet sealing valve 174, and changes, i.e., learns, the AUXS power-generation controlled opening degree to the valve-closing side (toward 0°).

Figure 32:
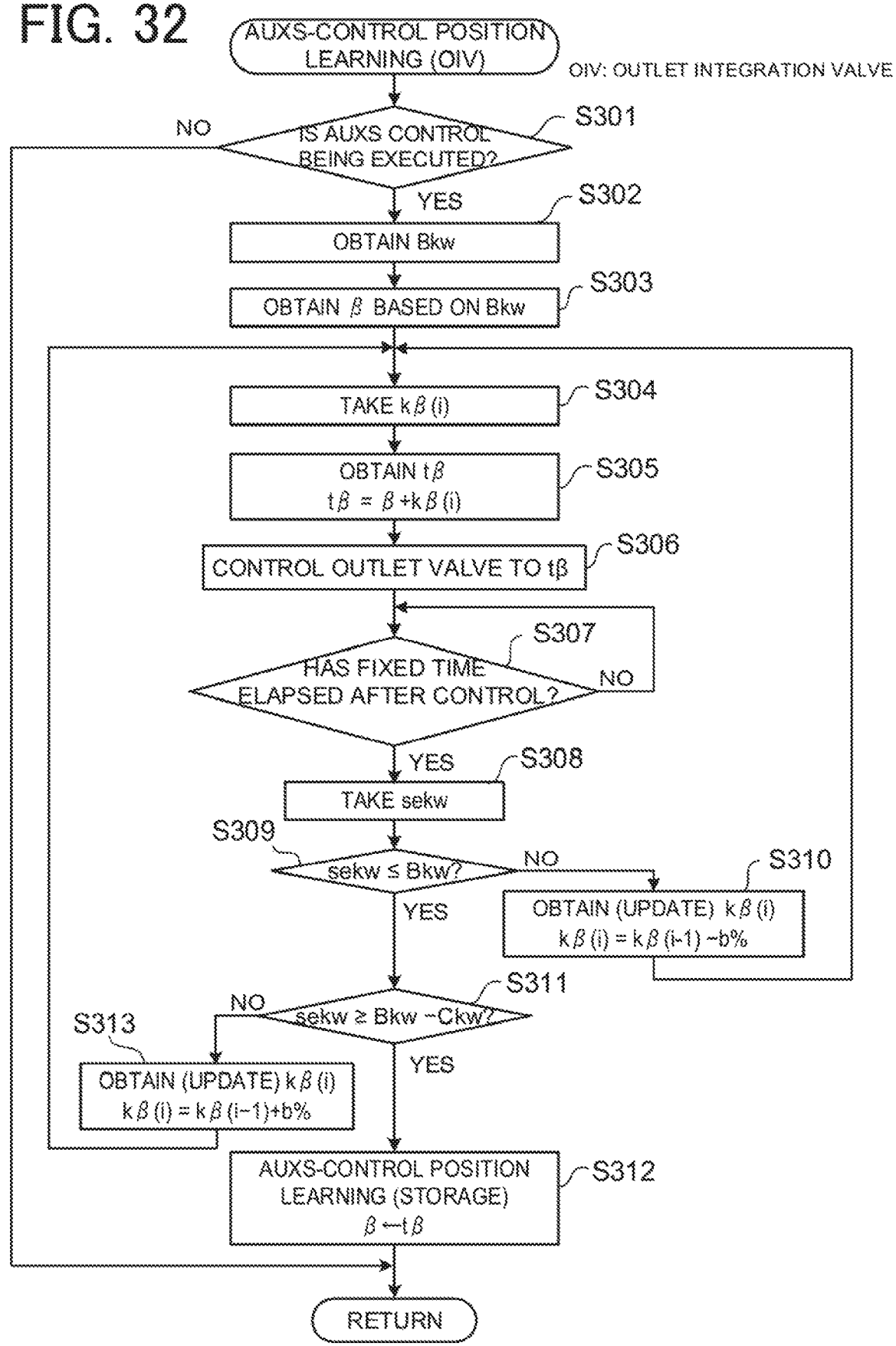
FIG. 32 is a flowchart showing contents of AUXS-control position learning.

To be concrete, the controller 201 performs the control shown in FIG. 32. As shown in FIG. 32, during execution of the AUXS control that controls the opening degree of the outlet integration valve 181 according to the AUXS power generation request (step S301: YES), the controller 201 obtains a request AUXS power-generation amount Bkw (step S302). Herein, the "request AUXS power-generation amount Bkw" is the amount of electric power generated in the fuel cell stack 111 requested to perform the AUXS control.

Figure 33:
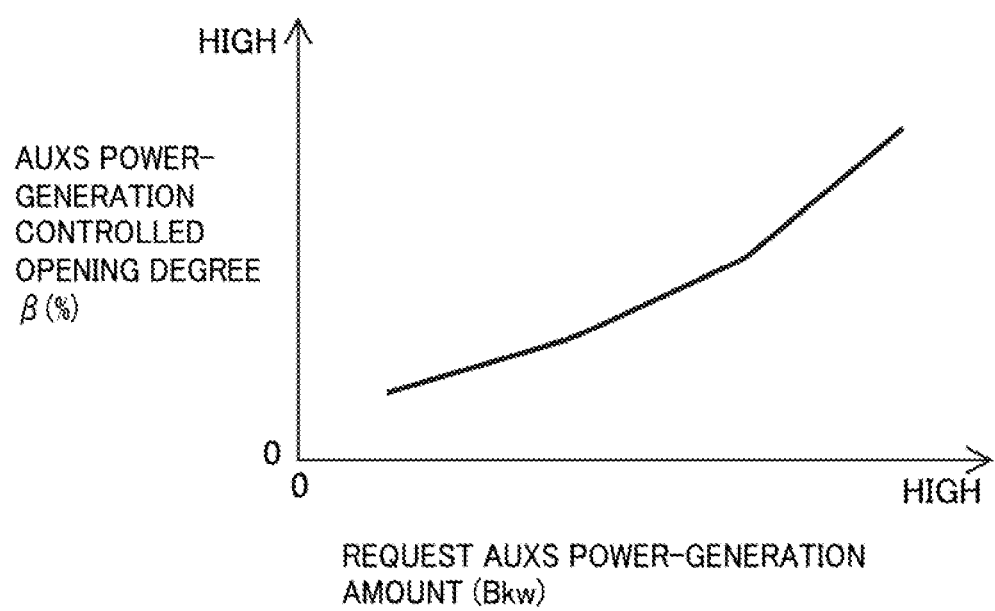
FIG. 33 is a graph showing a relationship between a request AUXS power-generation amount and an AUXS power-generation controlled opening degree.

Successively, the controller 201 obtains an AUXS power-generation controlled opening degree β, i.e., a target outlet-valve controlled opening degree, based on the obtained request AUXS power generation amount Bkw by referring to a relationship graph shown in FIG. 33.

The controller 201 then takes a correction controlled opening degree kβ(i) (step S304) and obtains an AUXS power-generation outlet-valve controlled opening degree tβ (step S305). Specifically, the controller 201 corrects the AUXS power-generation controlled opening degree β with the correction controlled opening degree kβ(i) to calculate the AUXS power-generation outlet-valve controlled opening degree tβ by the following expression:

$$tβ = β + kβ(i) \quad \text{(Exp. 2)}.$$

The controller 201 further adjusts the opening degree of the outlet integration valve 181 to the AUXS power-generation outlet-valve controlled opening degree tβ (step S306). Subsequently, after a lapse of a fixed time (e.g., several seconds (1 of 2 seconds)) (step S307: YES), the controller 201 takes the stack power generation amount sekw (step S308) and determines whether or not this stack power generation amount sekw is equal to or smaller than the request AUXS power generation amount Bkw (step S309).

In the present embodiment, as described above, after a lapse of the fixed time from when the outlet integration valve 181 is controlled to the AUXS power-generation outlet-valve controlled opening degree tβ, the air flow rate in the outlet integration valve 181 is evaluated based on the stack power generation amount sekw.

When the stack power generation amount sekw is determined to be larger than the request AUXS power generation amount Bkw (step S309: NO), it is considered that the flow rate of air flowing through the outlet integration valve 181 is excessive, that is, the air flow rate is higher than a first predetermined flow rate, the controller 201 obtains the correction controlled opening degree kβ(i) (step S310). Herein, in step S310, the controller 201 updates the correction controlled opening degree kβ(i) to the valve-closing side (toward 0°). In step S310, therefore, the controller 201 makes a calculation using the following expression:

$$kβ(i) = kβ(i-1) - b\% \quad \text{(Exp. 3)}$$

wherein b % is for example 0.1% to 1% and larger than the foregoing a %.

Subsequently, the controller 201 takes the correction controlled opening degree kβ(i) (step S304). After performing the processings in steps S305 to S308, when the controller 201 determines that the stack power generation amount sekw is equal to or smaller than the request AUXS power generation amount Bkw (step S309: YES), the controller 201 further determines whether or not the stack power generation amount sekw is equal to or larger than a predetermined power generation amount (Bkw-Ckw) (step S311). This Ckw is a value for example as large as 10% to 20% of Bkw.

When the stack power generation amount sekw is determined to be equal to or larger than the predetermined power generation amount (Bkw-Ckw) (step S311: YES), the controller 201 performs the AUXS-control position learning (storage) (step S312). The controller 201 corrects the AUXS power-generation opening degree to the valve-closing side (toward 0°) until reaching a first target position opening degree at which the air flow rate in the outlet integration valve 181 becomes the first predetermined flow rate.

In contrast, when the stack power generation amount sekw is determined to be smaller than the predetermined power generation amount (Bkw-Ckw) (step S311: NO), it is conceived that the air flow rate in the outlet integration valve 181 is too low, that is, the air flow rate is lower than a second predetermined flow rate that is lower than the first predetermined flow rate, the controller 201 obtains the correction controlled opening degree kβ(i) (step S313) and further performs the processings in step S304 and subsequent steps. Herein, in step S313, the controller 201 updates the correction controlled opening degree kβ(i) to a valve-opening side. In step S313, therefore, the controller 201 makes a calculation using the following expression:

$$kβ(i) = kβ(i-1) + b\% \quad \text{(Exp. 4)}.$$

In the above way, the controller 201 corrects the AUXS power-generation opening degree to the valve-opening side until reaching a second target position opening degree at which the air flow rate in the outlet integration valve 181 becomes the second predetermined flow rate.

In the present embodiment as described above, the AUXS control is the control to be performed with a very small opening degree. This opening degree is anticipated to slightly deviate according to a power generation request (an opening degree). Thus, feedback control using the stack power generation amount sekw is performed.

According to the foregoing present embodiment, while the AUXS power-generation opening-degree control is being executed, when the air flow rate in the outlet integration valve 181 is determined to be higher than the first predetermined flow rate, the controller 201 corrects the AUXS power-generation opening degree to the valve-closing side until reaching the first target position opening degree at which the air flow rate in the outlet integration valve 181 becomes the first predetermined flow rate.

Accordingly, during execution of the AUXS power-generation opening-degree control, when the air flow rate in the outlet integration valve 181 increases due to wear of the seal part 21a, the controller 201 corrects the AUXS power-generation opening degree to the valve-closing side according to the wear amount of the seal part 21a, so that the air flow rate in the outlet integration valve 181 can be adjusted to the target flow rate. Thus, unnecessary (excess) air supply to the fuel cell stack 111 is reduced and thus unnecessary (excess) power generation in the fuel cell stack 111 can be prevented. Consequently, the system can prevent the electric power from being excessively generated in the fuel cell stack 111 and thus prevent deterioration of fuel consumption, and also can eliminate the need to unnecessarily drive the auxiliaries.

When the controller 201 determines that the air flow rate in the outlet integration valve 181 is lower than the second predetermined flow rate that is lower than the first predetermined flow rate while performing the AUXS power-generation opening-degree control, the controller 201 corrects the AUXS power-generation opening degree to the valve-opening side until reaching the second target position opening degree at which the air flow rate in the outlet integration valve 181 becomes the second predetermined flow rate.

Accordingly, when the control that corrects the AUXS power-generation opening degree is performed, it is possible to prevent the occurrence of hunching of the outlet integration valve 181 and regulate the air flow rate in the outlet integration valve 181 within a target range. Therefore, the fuel cell stack 111 can generate the electric power as requested and thus enables the auxiliaries to be driven in response to the AUXS power generation request.

The controller 201 further determines the air flow rate in the outlet integration valve 181 based on the stack power generation amount sekw. Accordingly, there is no need to further adopt a supplementary detecting means, such as a sensor, for detecting the air flow rate in the outlet integration valve 181. Cost reduction can thus be achieved.

The foregoing embodiments are mere example and give no limitations to the present disclosure. The present disclosure may be embodied in other specific forms without departing from the essential characteristics thereof. For instance, in the foregoing embodiment, the rubber seat 21 is provided in the valve seat 13. As an alternative, this rubber seat 21 may be provided in the valve element 14. Furthermore, the rotary shaft 15 may be configured in a both-end supported structure that its both ends are supported by the first bearing 37 and another bearing separately provided on an opposite side of the valve element 14. The inlet sealing valve 174, the outlet integration valve 181, and the bypass valve 191 are not limited to the valves configured in the foregoing embodiment and may be other types of valves, such as a poppet valve in which a valve element that is movable in a direction perpendicular to a seat surface of a valve seat.

REFERENCE SIGNS LIST

2 Valve section
3 Drive mechanism section
11 Flow passage
13 Valve seat
14 Valve element
15 Rotary shaft
21 Rubber seat
21a Seal part
32 Motor
37 First bearing
38 Second bearing
40 Return spring
41 Main gear
101 Fuel cell system
111 Fuel cell stack (Fuel cell)
113 Air system
161 Air supply passage
162 Air exhaust passage
163 Bypass passage
172 Compressor
174 Inlet sealing valve
181 Outlet integration valve
191 Bypass valve
201 Controller
$\alpha$, $K\alpha^+$ Controlled fully-closed opening degree
sekw Stack power generation amount
Akw Predetermined power generation amount
Bkw Request AUXS power generation amount
$\beta$ AUXS power-generation controlled opening degree
$k\beta(i)$ Correction controlled opening degree
$t\beta$ AUXS power-generation outlet-valve controlled opening degree
(Bkw-Ckw) Predetermined power generation amount

The invention claimed is:

1. A fuel cell system comprising:
a fuel cell;
an oxidant gas supply passage for supplying oxidant gas to the fuel cell;
an upstream-side valve provided in the oxidant gas supply passage, the upstream-side valve comprising:
a valve seat;
a valve element; and
a drive mechanism configured to drive the valve element to open and close a gap between the valve seat and the valve element, wherein
either one of the valve seat and the valve element is provided with a seal member including a seal part that contacts with an other of the valve element and the valve seat during valve-closing; and
a controller programmed to:
when the upstream-side valve is to be fully closed, perform a controlled fully-closed opening-degree control that causes the drive mechanism to adjust an opening degree of the upstream-side valve to a controlled fully-closed opening degree that is larger than 0, and
while the controlled fully-closed opening-degree control is being performed, when it is determined that leakage of the oxidant gas occurs in the upstream-side valve, correct the controlled fully-closed opening degree to a valve-closing side until reaching a zero-position opening degree at which a leakage amount of the oxidant gas in the upstream-side valve becomes zero.

2. The fuel cell system according to claim 1, wherein the controller is configured to determine the leakage amount of the oxidant gas in the upstream-side valve based on a power generation amount of the fuel cell.

3. The fuel cell system according to claim 2, wherein the power generation amount of the fuel cell is an amount of electric power generated after the oxidant gas remaining in the fuel cell at start of the controlled fully-closed opening-degree control is consumed.

4. A fuel cell system comprising:
a fuel cell;
an oxidant gas exhaust passage for exhausting oxidant gas supplied to the fuel cell;
a downstream-side valve provided in the oxidant gas exhaust passage, the downstream-side valve comprising:
a valve seat;
a valve element; and
a drive mechanism configured to drive the valve element to open and close a gap between the valve seat and the valve element, wherein
either one of the valve seat and the valve element is provided with a seal member including a seal part that contacts with an other of the valve element and the valve seat during valve-closing; and
a controller programmed to:
when an auxiliaries (AUXS) power-generation request to cause the fuel cell to generate electric power to drive auxiliaries is present, perform an AUXS power-generation opening-degree control that causes the drive mechanism to adjust an opening degree of the downstream-side valve to an AUXS power-generation opening degree corresponding to a request AUXS power-generation amount, and
while the AUXS power-generation opening-degree control is being performed, when it is determined that a flow rate of the oxidant gas in the downstream-side valve is larger than a first predetermined flow rate, correct the AUXS power-generation opening degree to a valve-closing side until reaching a first target position opening degree at which the flow rate of the oxidant gas in the downstream-side valve becomes the first predetermined flow rate.

5. The fuel cell system according to claim 4, wherein while the AUXS power-generation opening-degree control is being performed, when it is determined that the flow rate of the oxidant gas in the downstream-side valve is lower than a second predetermined flow rate that is lower than the first flow rate, the controller is configured to correct the AUXS power-generation opening degree to a valve-opening side until reaching a second target position opening degree at which the flow rate of the oxidant gas in the downstream-side valve becomes the second predetermined flow rate.

6. The fuel cell system according to claim 4, wherein the controller is configured to determine the flow rate of the oxidant gas in the downstream-side valve based on a power generation amount of the fuel cell.

7. The fuel cell system according to claim 5, wherein the controller is configured to determine the flow rate of the oxidant gas in the downstream-side valve based on a power generation amount of the fuel cell.

* * * * *